United States Patent
Myung et al.

(10) Patent No.: US 12,376,099 B2
(45) Date of Patent: Jul. 29, 2025

(54) METHOD FOR TRANSMITTING AND RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Sechang Myung, Seoul (KR); Seonwook Kim, Seoul (KR); Suckchel Yang, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 820 days.

(21) Appl. No.: 17/428,899

(22) PCT Filed: Feb. 14, 2020

(86) PCT No.: PCT/KR2020/002154
§ 371 (c)(1),
(2) Date: Aug. 5, 2021

(87) PCT Pub. No.: WO2020/167059
PCT Pub. Date: Aug. 20, 2020

(65) Prior Publication Data
US 2022/0078822 A1    Mar. 10, 2022

(30) Foreign Application Priority Data

Feb. 15, 2019  (KR) .................. 10-2019-0018235
Aug. 16, 2019  (KR) .................. 10-2019-0100586

(51) Int. Cl.
*H04W 72/12*      (2023.01)
*H04W 72/1268*   (2023.01)
(Continued)

(52) U.S. Cl.
CPC ....... *H04W 72/1268* (2013.01); *H04W 72/23* (2023.01); *H04W 88/02* (2013.01)

(58) Field of Classification Search
CPC ............ H04W 72/1268; H04W 88/02; H04W 72/1289
See application file for complete search history.

(56) References Cited

U.S. PATENT DOCUMENTS

2018/0332505 A1   11/2018  Kim et al.
2019/0149305 A1*   5/2019  Zhou .................... H04L 5/0092
                                                               370/330
(Continued)

FOREIGN PATENT DOCUMENTS

KR     1020190013539 A     2/2019

OTHER PUBLICATIONS

"3rd Generation Partnership Project; Technical Specification Group Radio Access Network; NR; Medium Access Control (MAC) protocol specification (Release 15)", 3GPP TS 38.321 V15.4.0 (Dec. 2018).

(Continued)

*Primary Examiner* — Muthuswamy G Manoharan
(74) *Attorney, Agent, or Firm* — BRYAN CAVE LEIGHTON PAISNER LLP

(57) ABSTRACT

The present invention relates to a wireless communication system, specifically, to a method and an apparatus therefor, the method comprising: receiving BWP switching information from a first BWP; switching from the first BWP to a second BWP on the basis of the BWP switching information; switching to a third BWP different from the second BWP on the basis of transmission failure of a first uplink from the second BWP; and transmitting a second uplink from the third BWP, wherein the third BWP is one from among the (Continued)

first BWP, an initially activated BWP used for initial access, and a previously configured BWP.

11 Claims, 17 Drawing Sheets

(51) Int. Cl.
 *H04W 72/23* (2023.01)
 *H04W 88/02* (2009.01)

(56) References Cited

U.S. PATENT DOCUMENTS

2020/0127799 A1* 4/2020 Orsino ................ H04L 25/0226
2020/0288494 A1* 9/2020 Heo ...................... H04W 72/20
2020/0358587 A1* 11/2020 Wang ................... H04W 72/23

OTHER PUBLICATIONS

Vivo, "Discussion on BWP switching", 3GPP TSG-RAN WG2 Meeting #101, Feb. 26-Mar. 2, 2018, R2-1801993.
Samsung, "RRC-triggered BWP activation", 3GPP TSG-RAN WG2 NR #101b Meeting, Apr. 16-20, 2018, R2-1805844.

\* cited by examiner

FIG. 8
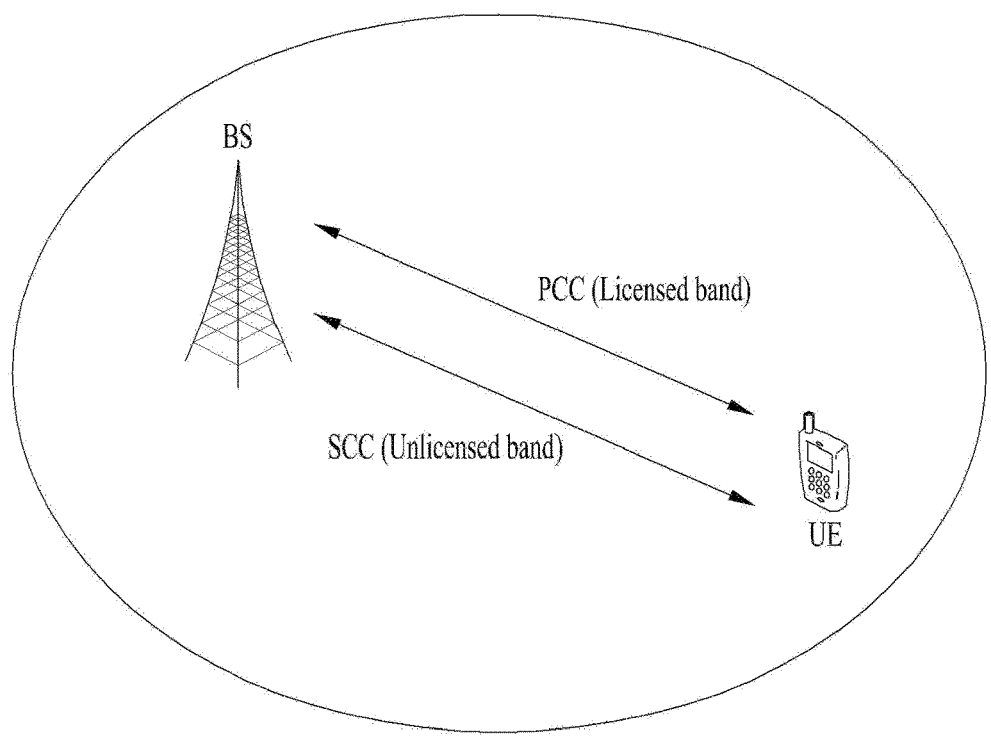
(a) Carrier aggregation between L-band and U-band
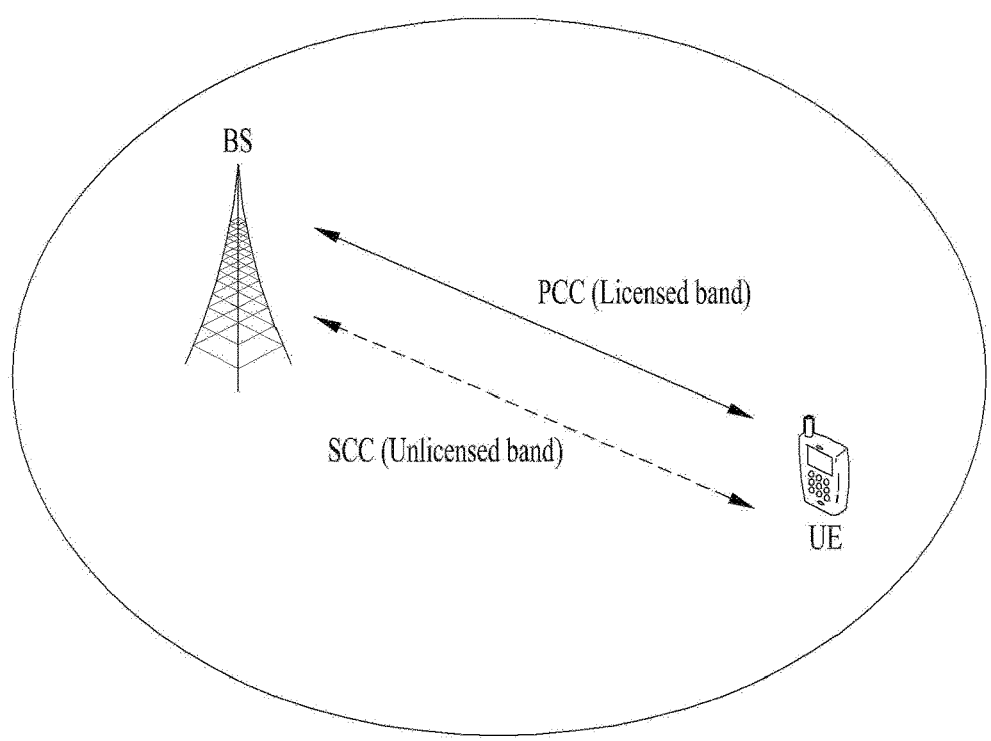

METHOD FOR TRANSMITTING AND RECEIVING SIGNAL IN WIRELESS COMMUNICATION SYSTEM AND APPARATUS SUPPORTING SAME

This application is the National Stage filing under 35 U.S.C. 371 of International Application No. PCT/KR2020/002154 filed on Feb. 14, 2020, which claims priority to Korean Patent Application Nos. 10-2019-0018235 filed on Feb. 15, 2019 and 10-2019-0100586 filed on Aug. 16, 2019, the contents of which are all hereby incorporated by reference herein in their entirety.

Technical Field

The present disclosure relates to a wireless communication system, and more particularly, to a method for transmitting and receiving a signal in a wireless communication system supporting an unlicensed band, and an apparatus supporting the same.

Background Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method and apparatus for efficiently performing a wireless signal transmission/reception procedure.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In a first aspect of the present disclosure, provided herein is a method carried out by a terminal in a wireless communication system, including: receiving bandwidth part (BWP) switching information in a first BWP; switching from the first BWP to a second BWP based on the BWP switching information; switching to a third BWP different from the second BWP based on failure to perform first uplink transmission in the second BWP; and performing a second uplink transmission in the third BWP, wherein the third BWP may be one of the first BWP, an initial active BWP used for initial access, or a preconfigured BWP.

In a second aspect of the present disclosure, provided herein is a terminal used in a wireless communication system, including: at least one processor; and at least one computer memory operatively coupled to the at least one processor and configured to cause, when executed, the at least one processor to perform an operation. The operation may include: receiving bandwidth part (BWP) switching information in a first BWP; switching from the first BWP to a second BWP based on the BWP switching information; switching to a third BWP different from the second BWP based on failure to perform first uplink transmission in the second BWP; and performing a second uplink transmission in the third BWP, wherein the third BWP may be one of the first BWP, an initial active BWP used for initial access, or a preconfigured BWP.

In a third aspect of the present disclosure, provided herein is an apparatus used in a wireless communication system, including: at least one processor; and one or more memories configured to store one or more instructions for causing the at least one processor to perform an operation. The operation may include: receiving bandwidth part (BWP) switching information in a first BWP; switching from the first BWP to a second BWP based on the BWP switching information; switching to a third BWP different from the second BWP based on failure to perform first uplink transmission in the second BWP; and performing a second uplink transmission in the third BWP, wherein the third BWP may be one of the first BWP, an initial active BWP used for initial access, or a preconfigured BWP.

In a fourth aspect of the present disclosure, provided herein is a processor-readable medium storing one or more instructions for causing at least one processor to perform an operation. The operation may include: receiving bandwidth part (BWP) switching information in a first BWP; switching from the first BWP to a second BWP based on the BWP switching information; switching to a third BWP different from the second BWP based on failure to perform the first uplink transmission in the second BWP; and performing a second uplink transmission in the third BWP, wherein the third BWP may be one of the first BWP, an initial active BWP used for initial access, or a preconfigured BWP.

The BWP switching information may be received by one of a higher layer signal or downlink control information (DCI) or may be acquired by expiration of a preset timer.

Downlink control information (DCI) including information on allocation of a resource for the first uplink transmission may be received, wherein the failure to perform the first uplink transmission in the second BWP may include failing to perform a channel access procedure (CAP) in a resource for the first uplink transmission for a preset time or a preset number of times.

The failure to perform the first uplink transmission in the second BWP may include failing to receive, in the second BWP, downlink control information (DCI) including information on allocation of a resource for the first uplink transmission for a predetermined time.

The second uplink may include an index of the third BWP or information on a result of the CAP in the second BWP.

The first uplink transmission and the second uplink transmission may be performed in an unlicensed band (U-band).

An apparatus device applied to embodiments of the present disclosure may include an autonomous driving device.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

Advantageous Effects

According to embodiments of the present disclosure, signal transmission and reception may be efficiently performed in a wireless communication system.

According to the embodiments of the present disclosure, ambiguity about an active BWP that may occur between a base station and a terminal when the terminal fails to receive a BWP switching indication may be prevented.

According to embodiments of the present disclosure, ambiguity about the active BWP that may occur between a base station and a terminal when the terminal fails in the CAP/LBT for uplink transmission may be prevented.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

FIG. 8 illustrates a wireless communication system supporting an unlicensed band;

Mode for the Disclosure

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

As more and more communication devices require larger communication capacities, the need for enhanced mobile broadband communication relative to the legacy radio access technologies (RATs) has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NR or New RAT in the present disclosure.

For clarity, 3GPP NR will be mainly described. However, the technical idea of the present disclosure is not limited thereto.

Overview of 3GPP system

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
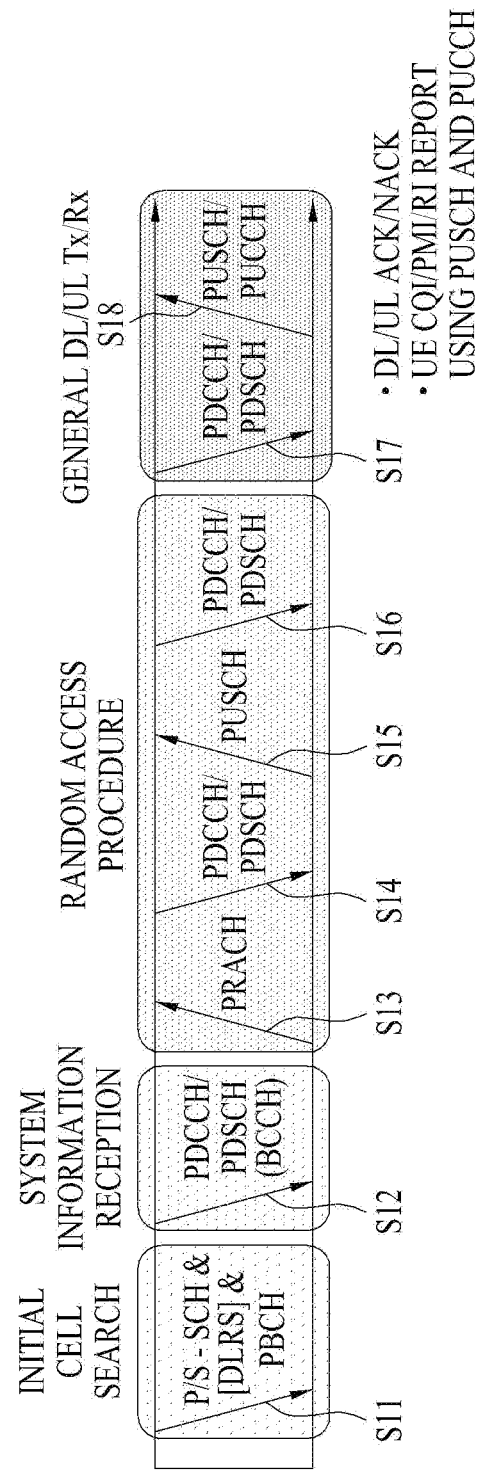
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

When the random access procedure is performed in two steps, steps S13 and S15 may be performed as one step (in which the UE performs transmission), and steps S14 and S16 may be performed as one step (in which the BS performs transmission). For example, the UE may transmit message 1 to the BS and receive message 2 from the BS as a response to message 1. Here, message 1 may be a combination of the preamble (S13)/PUSCH transmission (S15), and message 2 may be a combination of the RAR (S14)/collision resolution message (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

The UE may perform a network access procedure to carry out the procedures and/or methods (FIGS. 12 and 13) described/proposed in the present disclosure. For example, while accessing a network (e.g., a BS), the UE may receive system information and configuration information required to carry out the procedures and/or methods which will described/proposed below and store the same in a memory. The configuration information required for the present disclosure may be received through higher layer (e.g., RRC layer, medium access control (MAC) layer, etc.) signaling.

Figure 2:
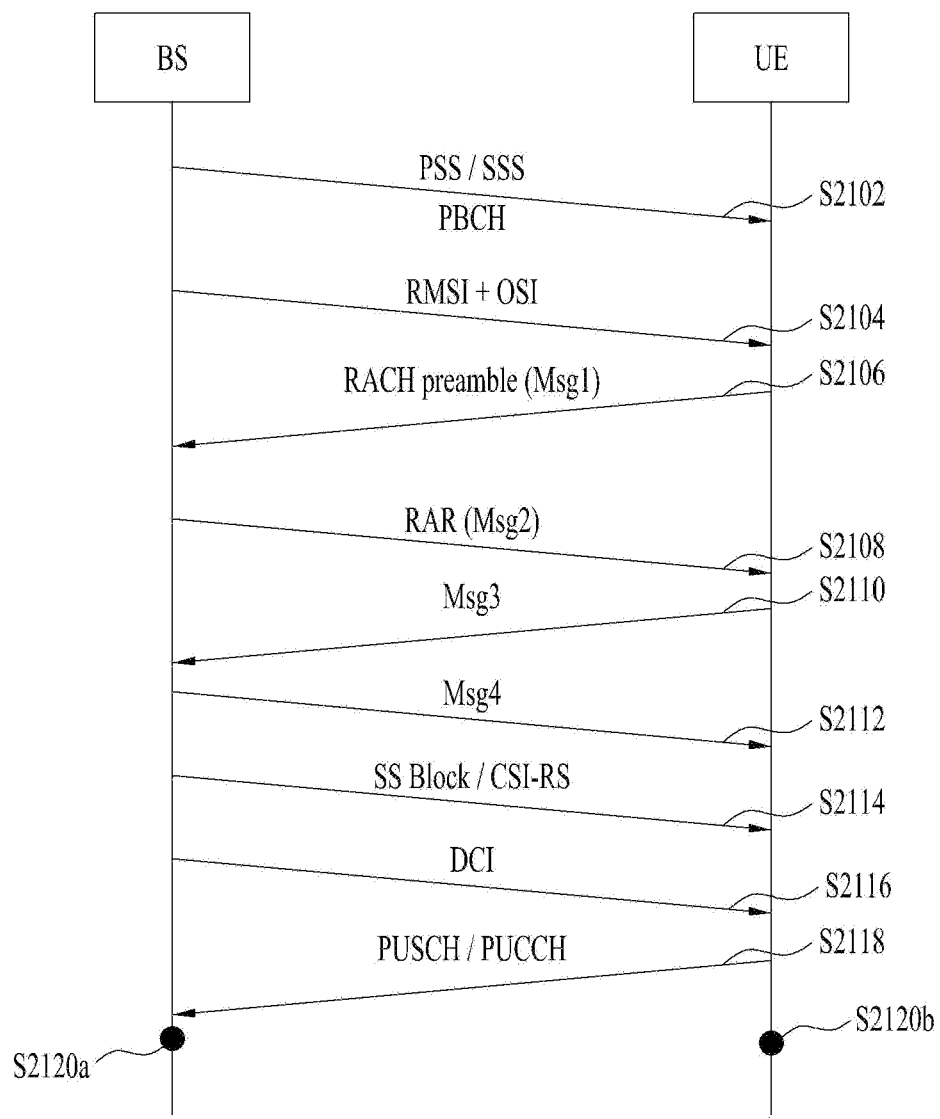
FIG. 2 illustrates initial network access and a subsequent communication procedure.

FIG. 2 illustrates initial network access and a subsequent communication procedure. In the NR system, a physical channel and a reference signal may be transmitted using beamforming. When beamforming-based signal transmission is supported, a beam management procedure may be involved in order to align beams between the BS and the UE. In addition, the signal proposed in the present disclosure may be transmitted/received using beamforming. In the radio resource control (RRC) IDLE mode, beam alignment may be performed based on a SSB. On the other hand, in the RRC CONNECTED mode, beam alignment may be performed based on CSI-RS (in DL) and SRS (in UL). When beamforming-based signal transmission is not supported, operations related to a beam may be skipped in the following description.

Referring to FIG. 2, a base station (BS) may periodically transmit an SSB (S2102). Here, the SSB includes PSS/SSS/PBCH. The SSB may be transmitted using beam sweeping. Thereafter, the BS may transmit remaining minimum system information (RMSI) and other system information (OSI) (S2104). The RMSI may include information (e.g., PRACH configuration information) necessary for the UE to initially access the BS. After performing SSB detection, the UE identifies the best SSB. Thereafter, the UE may transmit a RACH preamble (Message 1 (Msg1)) to the BS using a PRACH resource linked/corresponding to the index (i.e., the beam) of the best SSB (S2106). The beam direction of the RACH preamble is associated with the PRACH resource. The association between the PRACH resource (and/or the RACH preamble) and the SSB (index) may be configured through system information (e.g., RMSI). Thereafter, as part of the RACH procedure, the BS may transmit a random access response (RAR) (Msg2) in response to the RACH preamble (S2108), and the UE may transmit Msg3 (e.g., an RRC connection request) using the UL grant in the RAR (S2110). The BS may transmit a contention resolution message (Msg4) (S2112). Msg4 may include RRC connection setup. Here, Msg 1 and Msg 3 may be combined and operated in one step (e.g., Msg A), and Msg 2 and Msg 4 may be combined and operated in one step (e.g., Msg B).

When an RRC connection is established between the BS and the UE through the RACH procedure, subsequent beam alignment may be performed based on the SSB/CSI-RS (in DL) and the SRS (in UL). For example, the UE may receive an SSB/CSI-RS (S2114). The SSB/CSI-RS may be used by the UE in generating a beam/CSI report. The BS may make a request for a beam/CSI report to the UE through DCI (S2116). In this case, the UE may generate a beam/CSI report based on the SSB/CSI-RS, and transmit the generated beam/CSI report to the BS on the PUSCH/PUCCH (S2118). The beam/CSI report may include a beam measurement result and information about a preferred beam. The BS and the UE may perform beam switching based on the beam/CSI report (S2120a, S2120b).

Thereafter, the UE and the BS may perform the procedures and/or methods described/proposed below (see FIGS. 12 and 13). For example, the UE and the BS process the information in the memory according to the proposal in the present disclosure based on the configuration information obtained in the network access procedure (e.g., system information acquisition, RRC connection through RACH, etc.), or may process the received radio signal and store the same in the memory. Here, the radio signal may include at least one of a PDCCH, a PDSCH, or an RS in the case of the downlink, and may include at least one of a PUCCH, a PUSCH, or an SRS in the case of the uplink.

Figure 3:
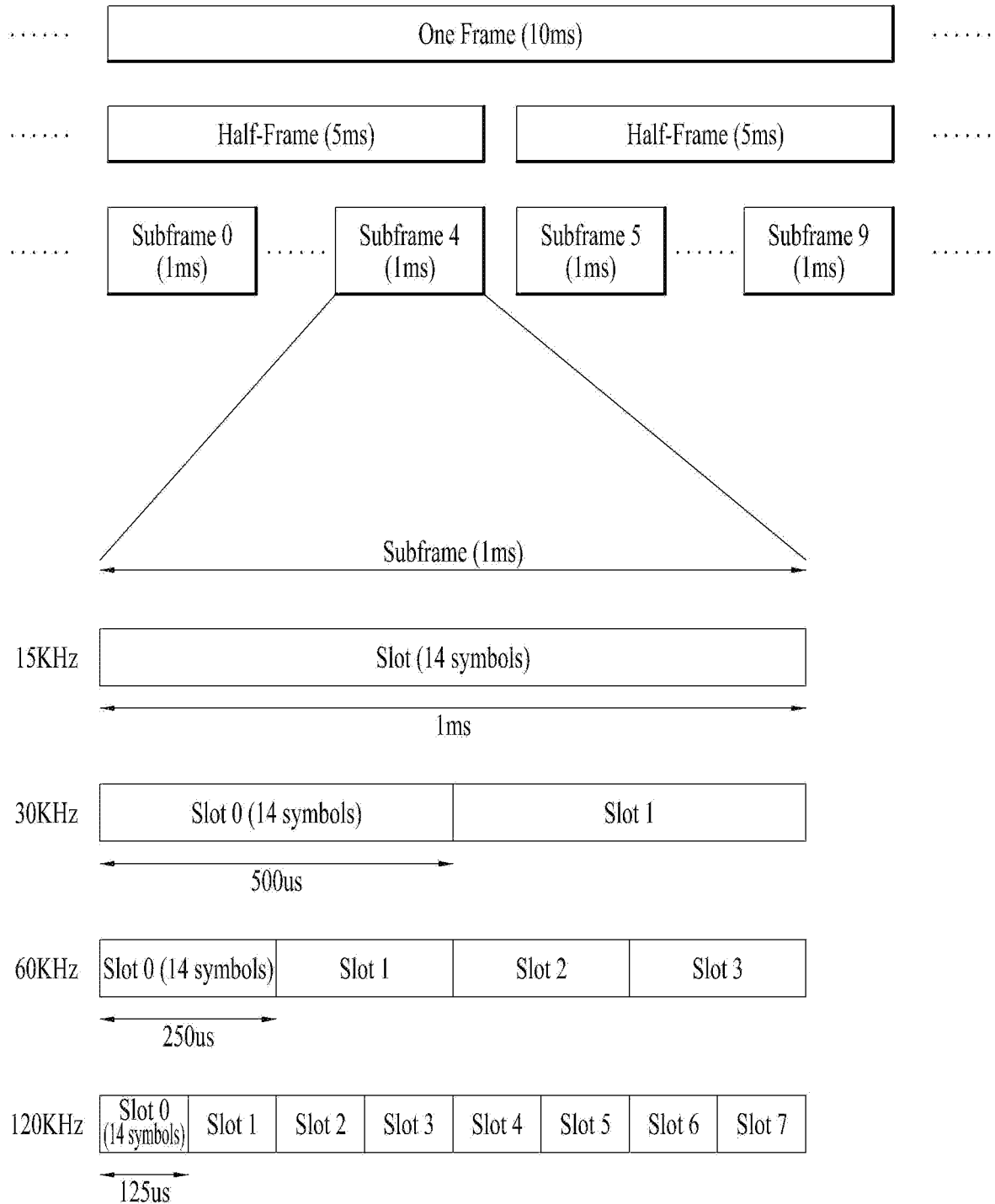
FIG. 3 illustrates a radio frame structure.

FIG. 3 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM (A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM (A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 4:
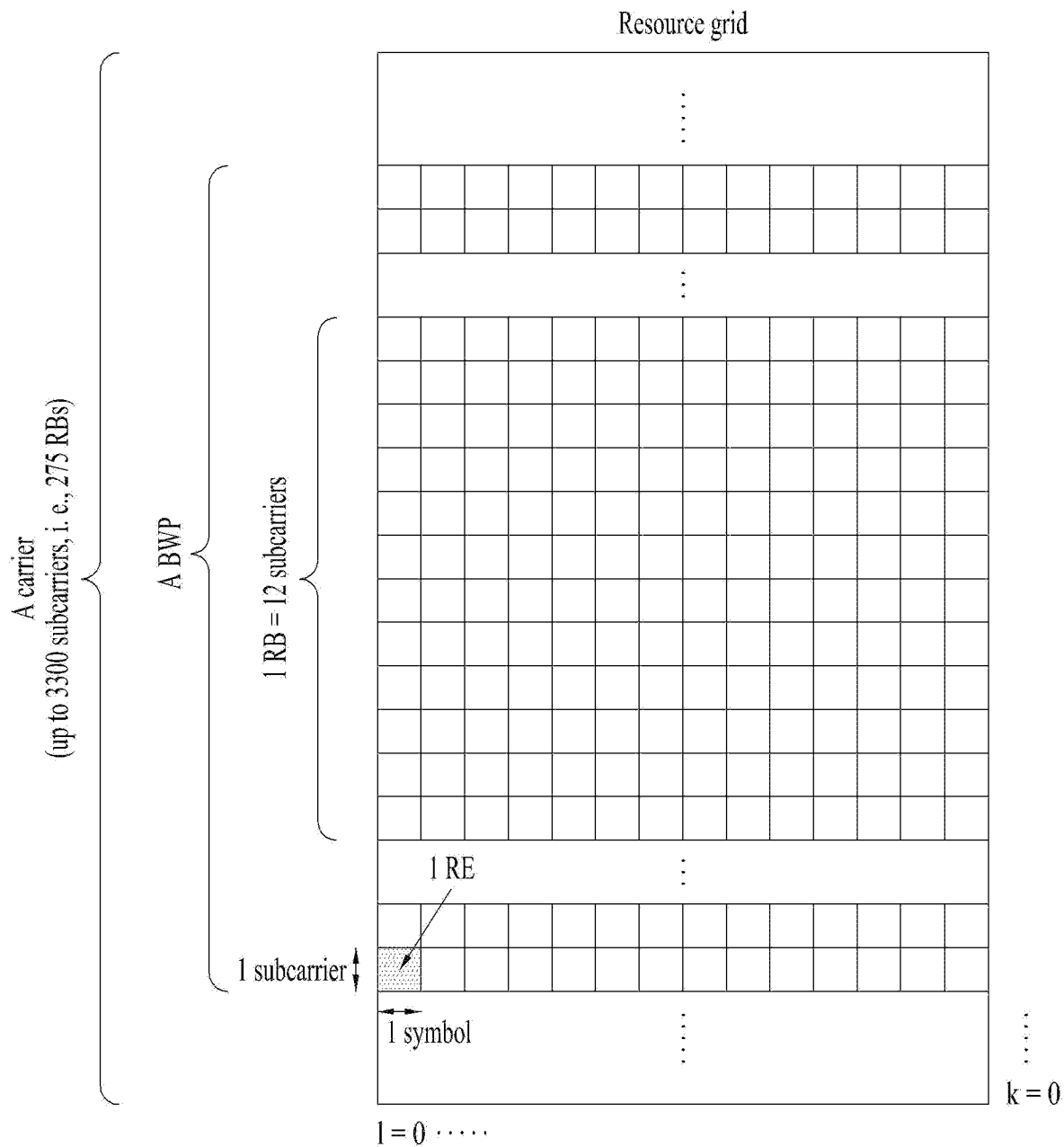
FIG. 4 illustrates a resource grid during the duration of a slot.

FIG. 4 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P) RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 5:
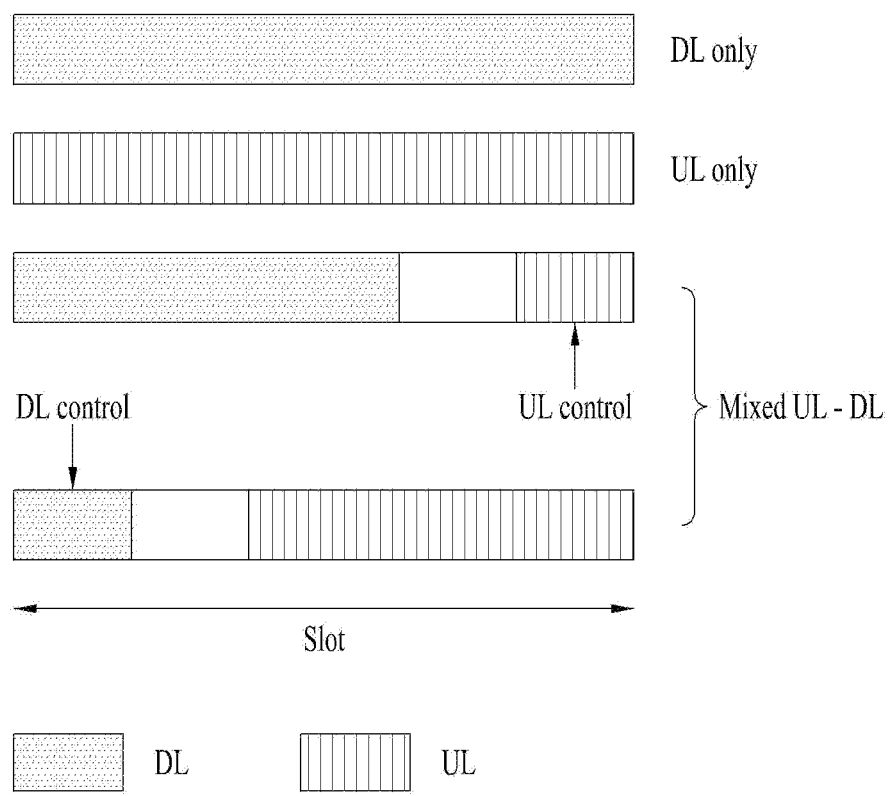
FIG. 5 illustrates a self-contained slot structure.

FIG. 5 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 6:
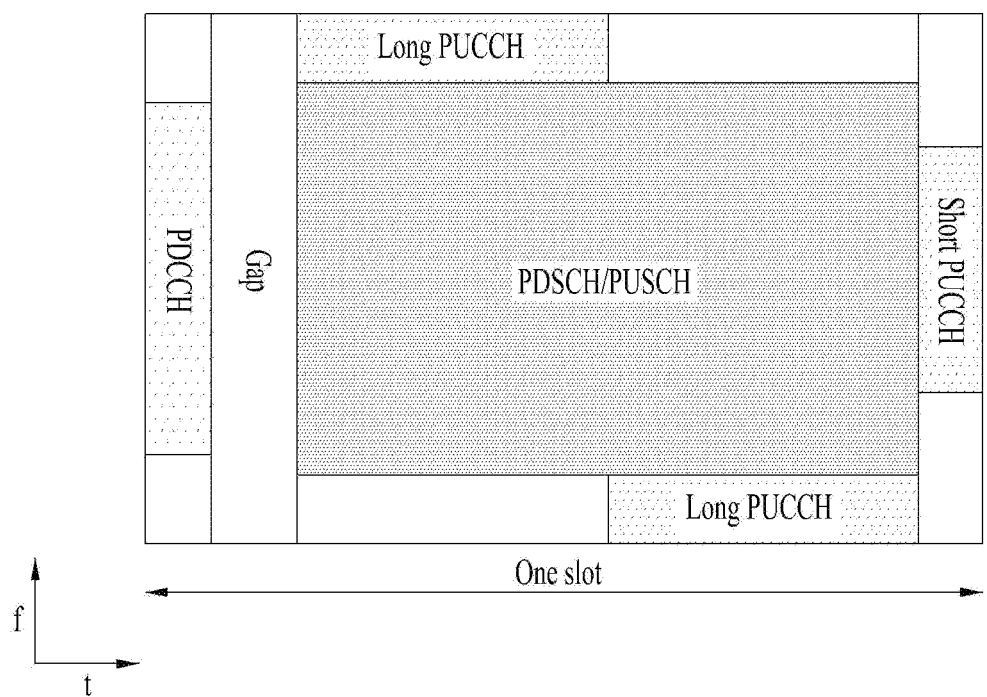
FIG. 6 illustrates exemplary mapping of physical channels in a slot.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region FIG. 6 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH uses a fixed modulation scheme (e.g., QPSK). One PDCCH includes 1, 2, 4, 8, or 16 control channel elements (CCEs) according to its aggregation level (AL). One CCE includes 6 resource element groups (REGs), each REG being defined by one OFDM symbol by one (P) RB. The PDCCH is transmitted in a control resource set (CORESET). The CORESET corresponds to a set of physical resources/parameters used to deliver the PDCCH/DCI in a BWP. For example, the CORESET is defined as a set of REGs with a given numerology (e.g., an SCS, a CP length, or the like). The CORESET may be configured by system information (e.g., a master information block (MIB)) or UE-specific higher-layer signaling (e.g., RRC signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes blind decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: indicates a CORESET associated with the SS set.
monitoringSlotPeriodicityAndOffset: indicates a PDCCH monitoring periodicity (in slots) and a PDCCH monitoring offset (in slots).
monitoringSymbolsWithinSlot: this indicates PDCCH monitoring symbols in a slot (e.g., first symbol(s) in the CORESET).
nrofCandidates: indicates the number of PDCCH candidates (e.g., one of 0, 1, 2, 3, 4, 5, 6, and 8) for each AL={1, 2, 4, 8, 16}.

An occasion (e.g., time/frequency resource) for monitoring PDCCH candidates is defined as a PDCCH (monitoring) occasion. One or more PDCCH (monitoring) occasions may be configured in a slot.

Table 3 lists exemplary PDCCH SSs.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| UE Specific | UE Specific | C-RNTI, or MCS-C-RNTI, or CS-RNTI(s) | User specific PDSCH decoding |

Table 4 illustrates exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.
HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.
CSI: feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | <2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |

TABLE 5-continued

| PUCCH format | Length in OFDM symbols $N_{symb}^{PUCCH}$ | Number of bits | Usage | Etc |
|---|---|---|---|---|
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

On DL, the BS may dynamically allocate resources for DL transmission to the UE by PDCCH(s) (including DCI format 1_0 or DCI format 1_1). Further, the BS may indicate to a specific UE that some of resources pre-scheduled for the UE have been pre-empted for signal transmission to another UE, by PDCCH(s) (including DCI format 2_1). Further, the BS may configure a DL assignment periodicity by higher-layer signaling and signal activation/deactivation of a configured DL assignment by a PDCCH in a semi-persistent scheduling (SPS) scheme, to provide a DL assignment for an initial HARQ transmission to the UE. When a retransmission for the initial HARQ transmission is required, the BS explicitly schedules retransmission resources through a PDCCH. When a DCI-based DL assignment collides with an SPS-based DL assignment, the UE may give priority to the DCI-based DL assignment.

Similarly to DL, for UL, the BS may dynamically allocate resources for UL transmission to the UE by PDCCH(s) (including DCI format 0_0 or DCI format 0_1). Further, the BS may allocate UL resources for initial HARQ transmission to the UE based on a configured grant (CG) method (similarly to SPS). Although dynamic scheduling involves a PDCCH for a PUSCH transmission, a configured grant does not involve a PDCCH for a PUSCH transmission. However, UL resources for retransmission are explicitly allocated by PDCCH(s). As such, an operation of preconfiguring UL resources without a dynamic grant (DG) (e.g., a UL grant through scheduling DCI) by the BS is referred to as a "CG". Two types are defined for the CG.

Type 1: a UL grant with a predetermined periodicity is provided by higher-layer signaling (without L1 signaling).

Type 2: the periodicity of a UL grant is configured by higher-layer signaling, and activation/deactivation of the CG is signaled by a PDCCH, to provide the UL grant.

That is, regarding uplink transmission of the UE, the UE may transmit a desired packet based on a dynamic grant or a preconfigured grant.

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

Figure 7:
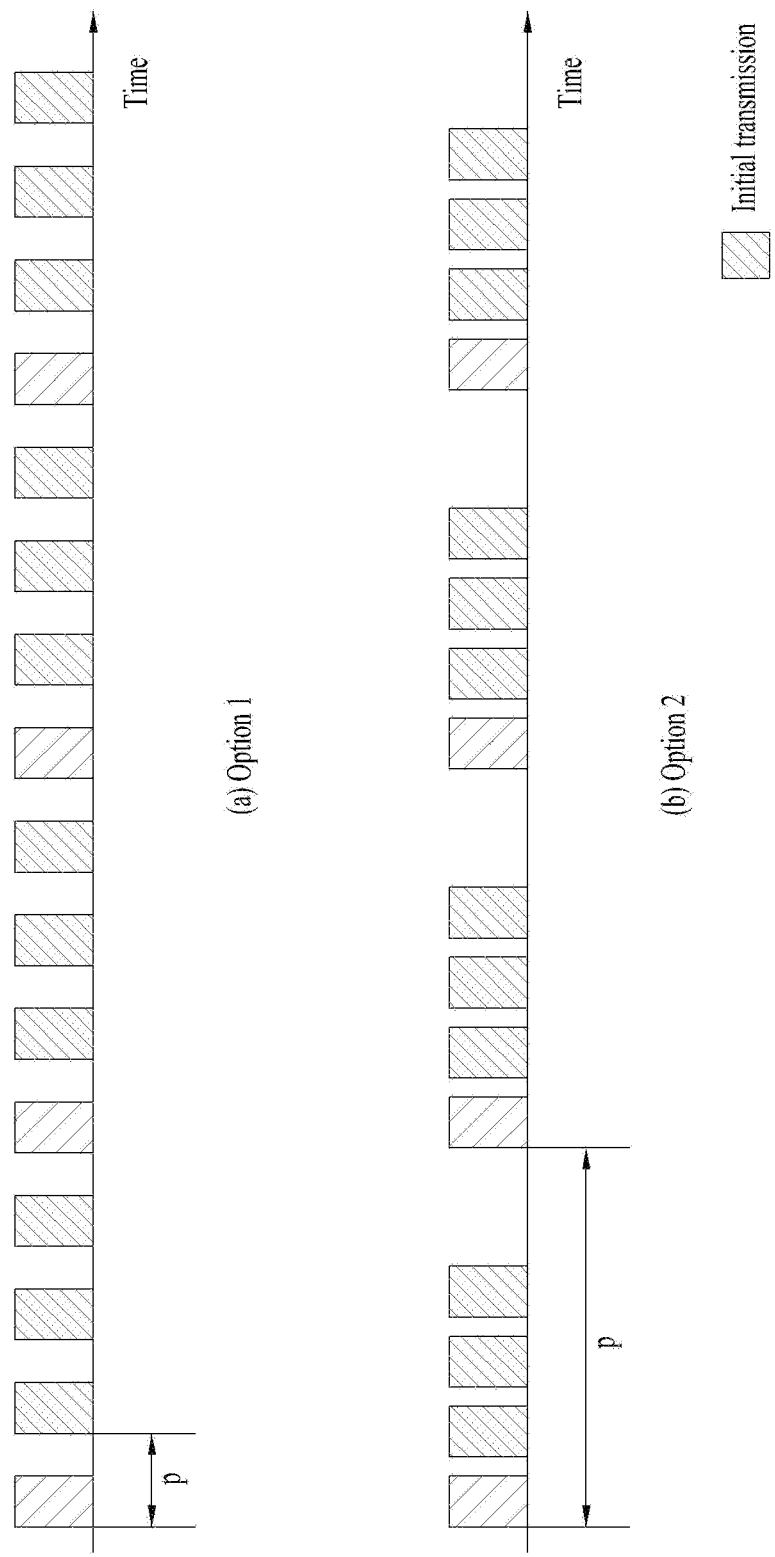
FIG. 7 illustrates exemplary repeated transmissions based on a configured grant.

FIG. 7 illustrates exemplary repeated transmissions based on a CG.

The UE performs repeated transmissions until one of the following conditions is satisfied:

A UL grant for the same TB is successfully received;
The repetition number of the TB reaches K; and
(In Option 2) the ending time of a period P is reached.

When there are multiple UEs having data to be transmitted on uplink/downlink in a wireless communication, a BS selects a UE that is to transmit data on a per transmission time internal (TTI) (e.g., slot) basis. In a system using multiple carriers or the like, the BS selects a UE that is to transmit data on uplink/downlink on a per TTI basis and also selects a frequency band to be used by the UE for data transmission.

When description is based on uplink (UL), UEs transmit reference signals (or pilot signals) on uplink and the BS identifies channel states of the UEs using the reference signals transmitted from the UEs and selects a UE that is to transmit data on uplink in each unit frequency band per TTI. The BS notifies the UEs of the result of selection. That is, the BS transmits, to a UL scheduled UE, a UL assignment message indicating that the UE should transmit data using a specific frequency band in a specific TTI. The UL assignement message is also referred to as a UL grant. The UEs transmit data on uplink according to the UL assignment message. The UL assignment message may contain UE identity (ID), RB allocation information, a modulation and coding scheme (MCS), a redundancy version (RV), new data indication (NDI) and the like.

In the case of synchronous HARQ, a retransmission time is appointed in the system (e.g., after 4 subframes from a NACK reception time) (synchronous HARQ). Accordingly, the eNB may send a UL grant message to UEs only in initial transmission and subsequent retransmission is performed according to an ACK/NACK signal (e.g., PHICH signal). In the case of asynchronous HARQ, a retransmission time is not appointed and thus the eNB needs to send a retransmission request message to UEs. Further, frequency resources or an MCS for retransmission are identical to those in previous transmission in the case of non-adaptive HARQ, whereas frequency resources or an MCS for retransmission may differ from those in previous transmission in the case of adaptive HARQ. For example, in the case of asynchronous adaptive HARQ, the retransmission request message may contain UE ID, RB allocation information, HARQ process ID/number, RV, and NDI information because frequency resources or an MCS for retransmission vary with transmission time.

In NR, a dynamic HARQ-ACK codebook-based scheme and a semi-static HARQ-ACK codebook-based scheme are supported. The HARQ-ACK (or A/N) codebook may be replaced with a HARQ-ACK payload.

When the dynamic HARQ-ACK codebook-based scheme is configured, the size of the A/N payload varies according to the number of actually scheduled DL data. To this end, a counter-downlink assignment index (DAI) and a total-DAI are included in a PDCCH related to DL scheduling. The counter-DAI indicates a scheduling order value of {CC, slot} calculated in a CC (component carrier) (or cell)-first manner, and is used to designate the position of an A/N bit in the A/N codebook. The total-DAI indicates a slot-based cumulative scheduling value up to the current slot, and is used to determine the size of the A/N codebook.

When the semi-static A/N codebook-based scheme is configured, the size of the A/N codebook is fixed (to the maximum value) regardless of the number of actually scheduled DL data. Specifically, the (maximum) A/N payload (size) transmitted on one PUCCH in one slot may be determined as the number of A/N bits corresponding to a combination of all CCs configured for the UE and all DL scheduling slots in which the A/N transmission timing may be indicated (or PDSCH transmission slots or PDCCH monitoring slots) (hereinafter, the combination is referred to as a bundling window). For example, DL grant DCI (PDCCH) may include PDSCH-to-A/N timing information. The PDSCH-to-A/N timing information may have one value (e.g., k) among a plurality of values. For example, when a PDSCH is received in slot #m, and PDSCH-to-A/N timing information in the DL grant DCI (PDCCH) for scheduling the PDSCH indicates k, the A/N information for the PDSCH may be transmitted in slot #(m+k). As an example, k∈{1, 2, 3, 4, 5, 6, 7, 8} may be given. On the other hand, when the A/N information is transmitted in slot #n, the A/N information may include the maximum possible A/N based on the bundling window. That is, the A/N information for slot #n may include A/N corresponding to slot #(n-k). For example, when k∈{1, 2, 3, 4, 5, 6, 7, 8}, the A/N information for slot #n includes A/Ns corresponding to slot #(n-8) to slot #(n-1) (i.e., the maximum number of A/Ns) regardless of actual reception of DL data. Here, the A/N information may be replaced with an A/N codebook or an A/N payload. Also, the slot may be understood/replaced as a candidate occasion for DL data reception. As an example, the bundling window may be determined based on the PDSCH-to-A/N timing with respect to the A/N slot, and the PDSCH-to-A/N timing set may have pre-defined values (e.g., {1, 2, 3, 4, 5, 6, 7, 8}), or may be configured by higher layer (RRC) signaling.

Recently, the 3GPP standardization organization is in the process of standardizing a 5G wireless communication system named NR (New RAT). The 3GPP NR system supports a plurality of logical networks in a single physical system and is designed to support services (e.g., eMBB, mMTC, URLLC, etc.) having various requirements by changing the transmission time interval (TTI) and OFDM numerology (e.g., OFDM symbol duration, subcarrier spacing (SCS)). As data traffic has rapidly increased due to the recent emergence of smart devices, utilizing unlicensed bands for cellular communication in the 3GPP NR system is considered as in the licensed-assisted access (LAA) of the existing 3GPP LTE system. However, unlike the LAA, an NR cell in the unlicensed band (hereinafter, NR UCell) aims at a stand-alone (SA) operation. As an example, PUCCH, PUSCH, and PRACH transmissions may be supported in the NR UCell.

In an NR system to which various embodiments of the present disclosure are applicable, a frequency resource of up to 400 MHz may be allocated/supported per one component carrier (CC). When a UE configured operate in such a wideband CC always operates with a radio frequency (RF) module for the entire CCs turned on, battery consumption of the UE may increase.

Alternatively, when several use cases (e.g., enhanced Mobile Broadband (eMBB), URLLC, massive machine type communication (mmTC), etc.) operating within one wideband CC are considered, different numerology (e.g., sub-carrier spacing) may be supported for each frequency band within the CC.

Alternatively, the capability for the maximum bandwidth may differ among UEs.

In consideration of this feature, a BS may instruct/configure the UE to operate only in a partial bandwidth rather than the entire bandwidth of the wideband CC. The partial bandwidth may be defined as a bandwidth part (BWP) for simplicity.

A BWP may be composed of consecutive resource blocks (RBs) in the frequency domain. One BWP may correspond to one numerology (e.g., sub-carrier spacing, CP length, slot/mini-slot duration).

The BS may configure multiple BWPs in one CC configured for the UE. For example, the BS may configure a BWP occupying a relatively small frequency region in a PDCCH monitoring slot, and schedule a PDSCH indicated by the PDCCH (or a PDSCH scheduled by the PDCCH) in a larger BWP. Alternatively, the BS may configure some UEs in other BWPs for load balancing when UEs are concentrated in a specific BWP. Alternatively, the BS may exclude a middle spectrum from the entire bandwidth in consideration of frequency domain inter-cell interference cancellation between neighboring cells and configure both side BWPs in the same slot.

The BS may configure at least one DL/UL BWP for a UE associated with the wideband CC, and activate at least one DL/UL BWP among the configured DL/UL BWP(s) at a specific time (by L1 signaling (e.g. DCI, etc.), MAC, RRC signaling, etc.). Also, it may indicate switching to another configured DL/UL BWP (by L1 signaling, MAC CE, or RRC signaling). In addition, the UE may perform the operation of switching to a predetermined DL/UL BWP when the timer expires based on a timer (e.g., BWP inactivity timer) value. Here, the activated DL/UL BWP may be referred to as an active DL/UL BWP. A UE may not receive the configuration for the DL/UL BWP from the BS before the initial access procedure is performed or the RRC connection is set up. A DL/UL BWP assumed for such a UE is defined as an initial active DL/UL BWP.

Unlicensed Band System

FIG. 8 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

Figure 9:
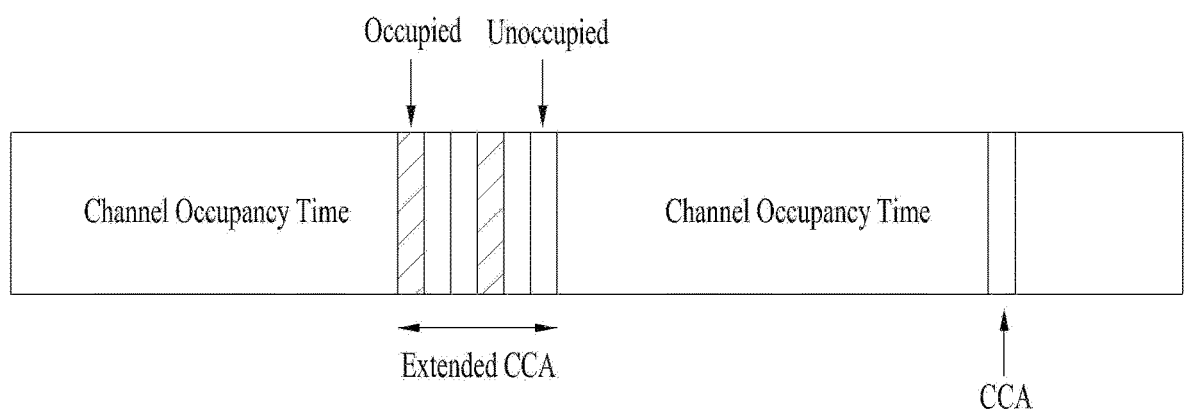
FIG. 9 illustrates an exemplary method of occupying resources in an unlicensed band.

When carrier aggregation (CA) is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 8 (a) shows a case in which the UE and BS exchange signals on both the LCC and UCC (non-stand-alone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9 (a) corresponds to the LAA of the 3GPP LTE system. FIG. 8 (b) shows a case in which the UE and BS exchange signals on one or more UCCs with no LCC (stand-alone (SA) mode). In this case, one of the UCCs may be set to the PCC, and the remaining UCCs may be set to the SCC. Both the NSA mode and SA mode may be supported in the U-band of the 3GPP NR system.

FIG. 9 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to (13/32) q ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to (13/32) q ms and transmit data.

The BS may perform one of the following unlicensed band access procedures (e.g., channel access procedures (CAPs)) to transmit a DL signal in the unlicensed band.

(1) First DL CAP method

Figure 10:
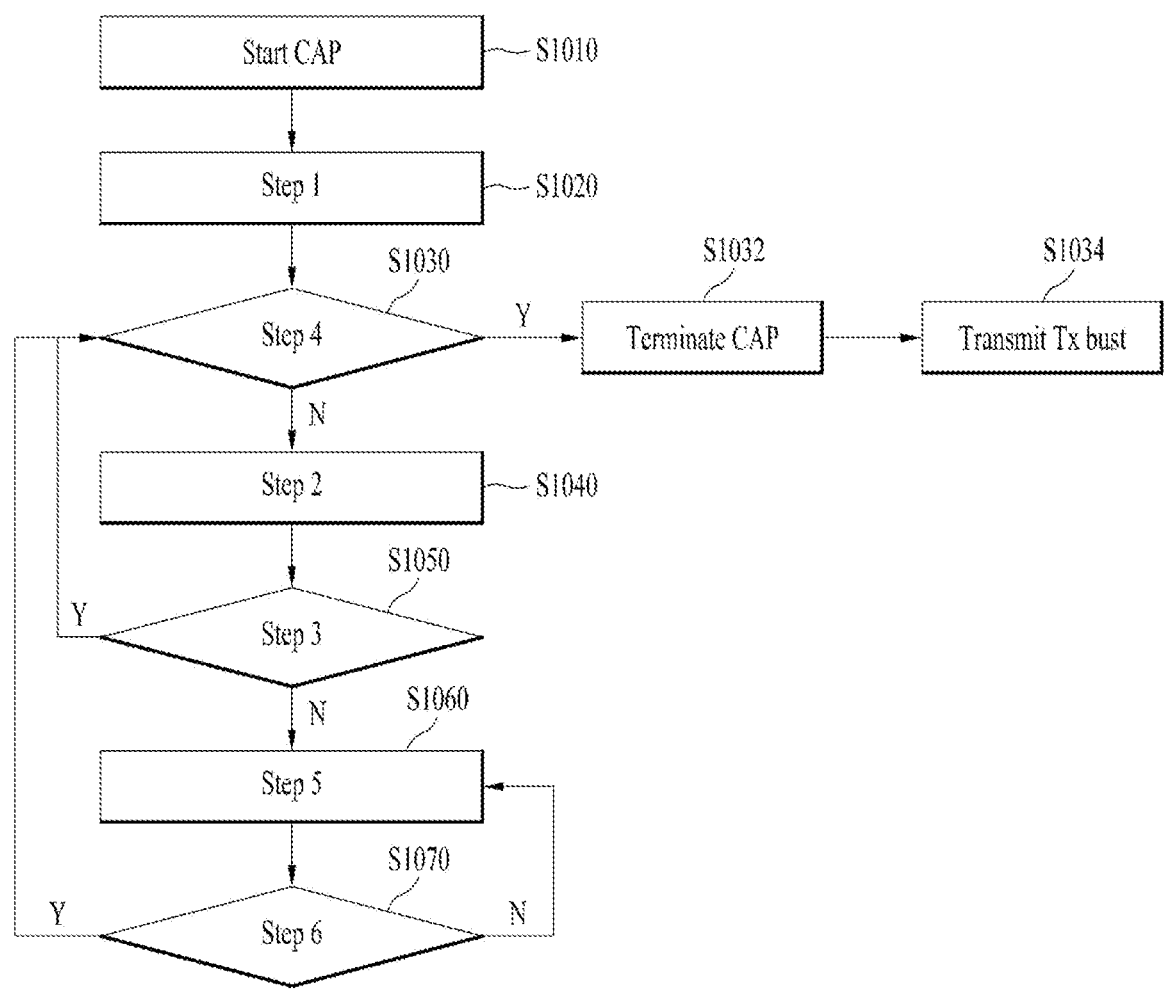
FIG. 10 illustrates an exemplary channel access procedure of a UE for DL signal transmission in an unlicensed band applicable to the present disclosure.

FIG. 10 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1010). The BS may randomly select a backoff counter N within a contention window (CW) according to step 1. N is set to an initial value $N_{init}$ (S1020). $N_{init}$ is a random value selected from the values between 0 and $CW_p$. Subsequently, when the backoff counter value N is 0 according to step 4 (S1030; Y), the BS terminates the CAP (S1032). The BS may then perform a Tx burst transmission including transmission of a PDSCH/PDCCH/EPDCCH (S1034). On the contrary, when the backoff counter value N is not 0 (S1030; N), the BS decrements the backoff counter value by 1 according to step 2 (S1040). Subsequently, the BS checks whether the channel of U-cell(s) is idle (S1050). If the channel is idle (S1050; Y), the BS determines whether the backoff counter value is 0 (S1030). On the contrary, when the channel is not idle, that is, the channel is busy (S1050; N), the BS determines whether the channel is idle during a longer defer duration $T_d$ (25 usec or longer) than a slot duration (e.g., 9 usec) according to step 5 (S1060). If the channel is idle during the defer duration (S1070; Y), the BS may resume the CAP. The defer duration may include a 16-usec duration and the immediately following $m_p$ consecutive slot durations (e.g., each being 9 usec). On the contrary, if the channel is busy during the defer duration (S1070; N), the BS re-checks whether the channel of the U-cell(s) is idle during a new defer duration by performing step S1060 again.

Table 6 illustrates that $m_p$, a minimum CW, a maximum CW, a maximum channel occupancy time (MCOT), and an allowed CW size applied to a CAP vary according to channel access priority classes.

TABLE 6

| Channel Access Priority Class (p) | $m_p$ | $CW_{min,p}$ | $CW_{max,p}$ | $T_{ulcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}=25$ us. Tars includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Further, the UE performs a contention-based CAP for a UL signal transmission in an unlicensed band. The UE performs a Type 1 or Type 2 CAP for the UL signal transmission in the unlicensed band. In general, the UE may perform a CAP (e.g., Type 1 or Type 2) configured for a UL signal transmission by the BS.

(1) Type 1 UL CAP Method

Figure 11:
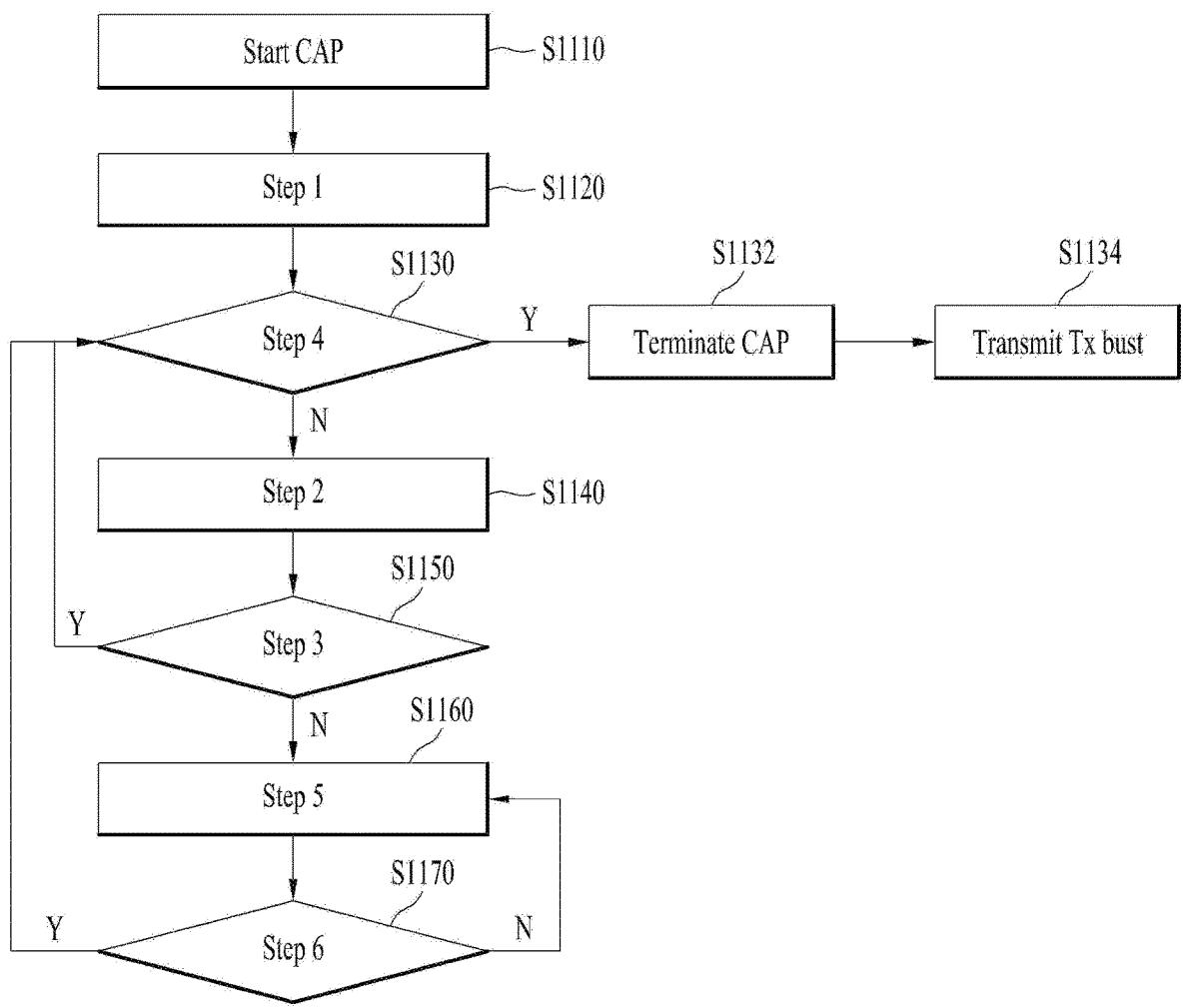
FIG. 11 illustrates an exemplary channel access procedure of a UE for UL signal transmission in an unlicensed band applicable to the present disclosure.

FIG. 11 is a flowchart illustrating UE's Type 1 CAP operation for UL signal transmission.

To transmit a signal in the U-band, the UE may initiate a CAP (S1110). The UE may randomly select a backoff counter N within a contention window (CW) according to step 1. In this case, N is set to an initial value $N_{init}$ (S1120). $N_{init}$ may have a random value between 0 and $CW_p$. If it is determined according to step 4 that the backoff counter value (N) is 0 (YES in S1130), the UE terminates the CAP (S1132). Then, the UE may perform Tx burst transmission (S1134). If the backoff counter value is non-zero (NO in S1130), the UE decreases the backoff counter value by 1 according to step 2 (S1140). The UE checks whether the channel of U-cell(s) is idle (S1150). If the channel is idle (YES in S1150), the UE checks whether the backoff counter value is 0 (S1130). On the contrary, if the channel is not idle in S1150, that is, if the channel is busy (NO in S1150), the UE checks whether the corresponding channel is idle for a defer duration Ta (longer than or equal to 25 usec), which is longer than a slot duration (e.g., 9 usec), according to step 5 (S1160). If the channel is idle for the defer duration (YES in S1170), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1170), the UE performs step S1160 again to check whether the channel is idle for a new defer duration.

Table 7 shows that the values of $m_p$, a minimum CW, a maximum CW, an MCOT, and allowed CW sizes, which are applied to the CAP, vary depending on channel access priority classes.

TABLE 7

| Channel Access Priority Class (p) | $m_p$ | $CW_{min,p}$ | $CW_{max,p}$ | $T_{ulcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,\ p}$ for every priority class $p\in\{1,2,3,4\}$. Otherwise, the UE may increase $CW_p$ for every priority class $p\in\{1,2,3,4\}$ to a next higher allowed value. A reference subframe (or reference slot) $n_{ref}$ may be determined as follows.

When the UE receives a UL grant in a subframe (or slot) $n_g$ and performs transmission including a UL-SCH, which has no gaps and starts from a subframe (or slot) $n_0$, in subframes (or slots) $n_0, n_1, \ldots, n_w$ (here, the subframe (or slot) $n_w$ is the most recent subframe (or slot) before a subframe $n_g$–3 in which the UE has transmitted the UL-SCH based on the Type 1 CAP), the reference subframe (or slot) $n_{ref}$ may be the subframe no.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

In NR-U, when the BW of a BWP assigned to the BS or UE is greater than or equal to 20 MHz, the BWP may be divided by an integer multiple of 20 MHz for fair coexistence with Wi-Fi to perform LBT in units of 20 MHz and transmit each signal. A frequency unit in which LBT is performed is referred to as a channel or an LBT sub-band. 20 MHz has a meaning as a frequency unit in which LBT is performed, and various embodiments of the present disclosure are not limited to a specific frequency value such as 20 MHz.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

In LTE LAA, the BS may announce, to the UE, an autonomous uplink (AUL) subframe or slot in which autonomous UL transmission allowing UL data to transmitted without a UL grant through an X-bit bitmap (e.g., X=40 bits).

When auto Tx activation is indicated to the UE, the UE may transmit UL data without a UL grant in a subframe or slot indicated in the bitmap. Just as the BS transmits the PDCCH, which is scheduling information required for decoding, to the UE together with the PDSCH, the UE also transmits AUL UCI, which is information necessary for the BS to decode the PUSCH, when transmitting the PUSCH on AUL. The AUL UCI includes information necessary for reception of the AUL PUSCH, such as HARQ ID, NDI, RV, AUL SF starting position, and AUL SF ending position, and information for sharing UE-initiated COT with the BS. Sharing the UE-initiated COT with the BS specifically means an operation of transferring a portion of a channel occupied by the UE to the BS through a random back-off-based category 4 LBT (or type 1 channel access procedure) and allowing the BS to transmit the PDCCH (and PDSCH) through the one-shot LBT of 25 usec (using the timing gap provided by the UE emptying the last symbol) when the channel is idle.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of initial transmission timing, time/frequency resource allocation, a DMRS parameter, and an MCS/TBS) by activation DCI as L1 signaling.

The biggest difference between the AUL of LTE LAA and the configured grant of NR is related to a HARQ-ACK feedback transmission method for the PUSCH transmitted by the UE without the UL grant and the presence/absence of UCI transmitted together in PUSCH transmission. In the configured grant of NR, the HARQ process is determined using the equation of the symbol index, period, and number of HARQ processes. On the other hand, in LTE LAA, explicit HARQ-ACK feedback information is transmitted through AUL-downlink feedback information (DFI). In LTE LAA, whenever the AUL PUSCH is transmitted, UCI containing information such as HARQ ID, NDI, and RV is also transmitted through AUL-UCI. The BS recognizes the UE as a UE using a time/frequency resource used for PUSCH transmission and the DMRS resource in the configured grant of NR. In LTE LAA, the UE is recognized by UE ID explicitly included in the AUL-UCI transmitted together with the PUSCH along with the DMRS resource.

Regarding the proposed method described below, NR-based channel access schemes for an unlicensed band used in the present disclosure may be classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS) i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The following description is given with the appreciation that the term band may be interchangeably used with CC/cell, and a CC/cell (index) may be replaced with a BWP (index) configured within the CC/cell, or a combination of the CC/cell (index) and the BWP (index).

Terms are Defined as Follows

UCI: control information transmitted on UL by the UE. UCI includes various types of control information (i.e., UCI types). For example, the UCI may include an HARQ-ACK (simply, A/N or AN), an SR, and CSI.

PUCCH: a physical layer UL channel for UCI transmission. For convenience, PUCCH resources configured and/or indicated for A/N, SR, and CSI transmission are referred to as A/N PUCCH resources, SR PUCCH resources, and CSI PUCCH resources, respectively.

UL grant DCI: DCI for a UL grant. For example, UL grant DCI means DCI formats 0_0 and 0_1, and is transmitted on a PDCCH.

DL assignment/grant DCI: DCI for a DL grant. For example, DL assignment/grant DCI means DCI formats 1_0 and 1_1, and is transmitted on a PDCCH.

PUSCH: a physical layer UL channel for UL data transmission.

Slot: a basic time unit (TU) (or time interval) for data scheduling. A slot includes a plurality of symbols. Herein, a symbol includes an OFDM symbol (e.g., CP-OFDM symbol or DFT-s-OFDM symbol). In this specification, the terms symbol, OFDM-based symbol, OFDM symbol, CP-OFDM symbol, and DFT-s-OFDM symbol may be replaced with each other.

Channel: a carrier or a part of a carrier composed of a set of contiguous RBs in which a CAP is performed in a shared spectrum. For example, a channel may mean a frequency unit in which LBT is performed, and may be interchangeably used with an LBT-SB in the following description.

LBT for channel X: this means that LBT is performed to check whether channel X is available. For example, before a transmission starts on channel X, a CAP may be performed. For example, a CAP procedure (e.g., see FIG. 10) may be performed before the transmission of channel X is started.

BWP switching: As described above, the NR system may support up to 400 MHZ on one carrier. Therefore, for efficient use of frequency, BWP has been introduced such that the entire system bandwidth may be divided and used, and only one BWP may be activated at a specific time. BWP switching may mean an operation of selecting a BWP to be activated and switching an active BWP of the UE to the selected BWP. BWP switching may be controlled by a PDCCH (e.g., DCI format 0_1), an RRC signal, a BWP inactivity timer, and the like.

BWP inactivity timer: This is a timer used to perform BWP switching from a BWP where the UE is currently positioned to another BWP (e.g., the default BWP or the initial BWP). The value of the BWP inactivity timer may be defined as the number of slots, a time (in ms), or the number of PDCCH monitoring occasions. When the PDCCH decoding is successfully performed in the serving cell and/or the active BWP, the timer is reset/restarted. When the timer expires (e.g., when DL/UL scheduling is not performed for a predetermined time), the BWP may be switched to a predetermined BWP (e.g., the default BWP or the initial BWP). Here, the default BWP may mean a BWP indicated through a higher layer (e.g., RRC) signal, and the initial BWP may mean a BWP used for initial access. When the default BWP is not separately indicated, the initial BWP may be used as the default BWP.

Each of the proposed methods described below may be combined with other proposed methods as long as they are not contrary to each other.

Hereinafter, the present disclosure proposes a method to avoid, in a wireless communication system composed of a BS and a UE in an unlicensed band, the ambiguity between the BS and the UE that may occur in relation to an active BWP when the UE misses an indication of BWP switching and/or the BS/UE fails in the LBT.

When the UE is instructed by the BS to switch to the configured DL/UL BWP (by L1 signaling, MAC CE, or RRC signaling), or the timer (e.g., BWP inactivity timer) expires, the UE may switch to the determined DL/UL BWP (e.g., the default BWP or initial BWP). When the UE is scheduled for PUSCH transmission in the switched BWP, it may perform Cat-4 LBT. When the UE succeeds in the LBT, it may transmit the PUSCH. However, when the Cat-4 LBT for PUSCH transmission fails for a certain time or a certain number of times and thus the PUSCH transmission fails, the BS does not know whether the UE fails to perform BWP switching due to missing of the indication for BWP switching or whether the UE has performed BWP switching, but has failed to perform PUSCH transmission due to LBT failure. Thereby, ambiguity may occur between the BS and the UE. In this regard, methods for preventing ambiguity that may occur between the BS and the UE according to BWP switching in an unlicensed band are proposed below.

[Proposed method #1] When the UE receives an indication for BWP switching from the BS, the UE may perform LBT in the current BWP, transmit an acknowledgement message (in the current BWP), and then switch to the indicated BWP.

(1) When the UE receives an indication for BWP switching through DL assignment DCI (e.g., PDSCH scheduling DCI), the UE may transmit an acknowledgement message to the BS through a PUCCH resource (in the BWP before the switching) indicated by the DL assignment DCI or a preconfigured PUCCH resource (in the BWP before the switching), and switch to the indicated BWP.

(2) When the UE receives an indication for BWP switching through UL grant DCI (e.g., PUSCH scheduling DCI), the UE may transmit an acknowledgement message to the BS through a PUCCH resource (in the BWP before the switching) indicated by the UL grant DCI or a preconfigured PUCCH resource (in the BWP before the switching), and switch to the indicated BWP.

(3) When BWP switching is to be performed according to expiration of a timer (e.g., the BWP inactivity timer), a the UE may transmit an acknowledgement message to the BS through a preconfigured PUCCH resource (in the BWP before the switching), and perform BWP switching.

However, in this case, the UE may perform a DL/UL transmission/reception operation (e.g., PDCCH monitoring) in the (new) BWP indicated through the indication for BWP switching (DCI including the indication for BWP switching). The preconfigured PUCCH resource may be a dedicated PUCCH resource configured by the BS through a higher layer signal (e.g., RRC signaling), or an initial/default PUCCH resource (which may be configured through RMSI, etc.).

In addition, when the BS indicates BWP switching through the DL assignment DCI or the UL grant DCI, it may cause the UE to share the COT to transmit an acknowledgement message through the Cat-1 LBT or Cat-2 LBT within the COT of the BS. Alternatively, only when the BS occupies a COT and then shares the COT with the UE and thus UL transmission is allowed after Cat-1 LBT (or Cat-2 LBT), the BS may be allowed to indicate BWP switching through DL assignment DCI or UL grant DCI. This is intended to ensure transmission of an acknowledgment message on uplink.

In the situation of DC/CA between the L-cell and the U-cell, the UE may periodically/aperiodically transmit active BWP related information for each CC or a BWP switching acknowledgement message to the BS through the LCC.

As an example, when BWP switching is indicated through the DL assignment DCI as in the case (1), the DCI may include scheduling information on resources of PDSCH and PUCCH to be transmitted after BWP switching. In order to confirm that the UE has properly received the BWP switching indication from the BS, the UE may transmit an acknowledgement message to the BS in the BWP prior to the BWP switching through a PUCCH resource indicated by the DL assignment DCI. Alternatively, the acknowledgement message may be transmitted in the BWP prior to the BWP switching through a specific PUCCH resource preconfigured for the UE by a higher layer signal or an initial/default PUCCH resource (which may be configured by RMSI, etc.).

As another example, when BWP switching is indicated through the UL grant DCI as in the case (2), the DCI may include scheduling information on a resource of PUSCH to be transmitted after BWP switching. In order to confirm that the UE has properly received the BWP switching indication from the BS, the UE may transmit an acknowledgement message to the BS in the BWP prior to the BWP switching through the PUSCH resource indicated by the UL grant DCI. Alternatively, the acknowledgement message may be transmitted in the BWP prior to the BWP switching through a specific PUCCH resource preconfigured for the UE by a higher layer signal or an initial/default PUCCH resource (which may be configured by RMSI, etc.).

As another example, when BWP switching is caused by the inactivity timer as in the case (3), an acknowledgement message may be transmitted in the BWP prior to the BWP switching through the initial/default PUCCH resource (which may be configured by RMSI, etc.).

In addition, in consideration of the possibility that transmission of the acknowledgement message from the UE through the PUCCH or PUSCH is delayed or fail due to the LBT, and fast BWP switching, the BS may share, with the UE, a COT remaining after transmitting the DL assignment DCI or the UL grant DCI in the cases (1) and (2) above such that the UE may transmit an acknowledgement message within the COT after Cat-1 LBT or Cat-2 LBT.

[Proposed method #2] When the UE fails in the UL transmission operation in the BWP after BWP switching based on the BWP switching indication (DCI including the BWP switching indication) from the BS, which will be described below, the UE may fall back to the previous BWP in which the BWP switching indication has been received, and perform a DL/UL transmission/reception operation (e.g., PDCCH monitoring).

(1) In performing BWP switching through DL assignment DCI, when UL transmission of PUCCH/SRS or the like indicated in the DL assignment DCI (or preconfigured) fails due to LBT failure, the UE may fall back to the BWP before switching and perform the DL/UL transmission/reception operation.

(2) In performing BWP switching through the UL grant DCI, when UL transmission of PUCCH/SRS or the like indicated in the UL assignment DCI (or preconfigured) fails due to LBT failure, the UE may fall back to the BWP before switching and perform the DL/UL transmission/reception operation.

The LBT failure may mean LBT failure occurring for a certain time or a certain number of times (e.g., 2 ms or twice). The certain time or the certain number of times may be a predetermined value, a default value, or a value set/indicated by the BS. Specifically, in the situation of DC/CA between the L-cell and the U-cell, the UE may periodically/aperiodically transmit active BWP related information for each CC to the BS through the LCC.

The BS may instruct the UE to perform BWP switching through the DL assignment DCI or UL grant DCI and UL transmission of PUCCH/SRS or PUSCH in the corresponding BWP. Then, the UE may successfully receive the DL assignment DCI or UL grant DCI and perform BWP switching, but may fail in UL transmission of the scheduled PUCCH/SRS or PUSCH due to LBT failure in the BWP after switching. Since the scheduled UL is not received, the BS cannot know whether the UE has successfully received the indication for BWP switching, and ambiguity may arise regarding the BWP in which the UE is currently positioned.

Therefore, when the UE fails to perform UL transmission due to LBT failure, it may fall back to the original BWP in which BWP switching has been indicated, and perform the DL/UL transmission/reception operation (e.g., PDCCH monitoring).

[Proposed method #3] When the UE receives an indication for BWP switching from the BS (by L1 signaling, MAC CE, or RRC signaling) by methods described below and fails in the LBT in the switched BWP for a certain time or a certain number of times or fails to receive an additional scheduling indication, the UE may switch to the pre-determined/indicated BWP (e.g., BWP before switching, initial BWP, or default BWP) and transmit information about SR transmission or the BWP to the BS using the initial/default PUCCH resource.

(1) A case where the UE receiving an indication for BWP switching through the DL assignment DCI performs BWP switching, but fails to receive additional DL assignment DCI and/or UL grant DCI in the switched BWP for a certain time (e.g., 2 ms) (where the certain time may be a predetermined value, a default value, or a value based on what is set/indicated by the BS);

(2) A case where the UE receiving an indication for BWP switching through the DL assignment DCI performs BWP switching, but fails in LBT for the PUCCH/SRS resource indicated in the switched BWP for a certain time or a certain number of times;

(3) A case where the UE receiving an indication for BWP switching through the UL grant DCI performs BWP switching, but fails in LBT for the UL indicated in the switched BWP for a certain time or a certain number of times;

(4) A case where, after BWP switching, the UE fails in LBT for the UL scheduled through the UL grant DCI for a certain time or a certain number of times;

(5) A case where, after performing BWP switching due to timer expiration, the LBT fails for a certain time or a certain number of times for the scheduled UL.

LBT failure means that the UE fails in LBT for a certain time or a certain number of times and thus fails to perform UL transmission. The certain time may be a predetermined value, a default value, or a value based on what is set/indicated by the BS.

In addition, the information on the BWP may be an active BWP index. PRACH, SRS, PUCCH, or the like may be used as information informing the BS of BWP switching due to LBT failure or the current BWP of the UE.

In the situation of DC/CA between the L-cell and the U-cell, the UE may periodically/aperiodically transmit active BWP related information for each CC to the BS through the LCC.

When the UE receiving the BWP switching indication from the BS fails to receive additional DL assignment DCI and/or UL grant DCI in a switched BWP for a certain time (e.g., 2 ms), synchronization may not be established between the UE and the BS or the BWP in which the UE is current positioned may be recognized differently between the UE and the BS. Therefore, the UE may switch to the pre-determined/indicated BWP (e.g., the BWP before switching, initial BWP, or default BWP) and transmit information about the BWP or SR transmission to the BS using the initial/default PUCCH resource.

As in proposed method #2, through DL assignment DCI or UL grant DCI, the BS may instruct the UE to perform UL transmission of PUCCH/SRS or PUSCH in the BWP to which the UE is to switch through the BWP switching operation. In this case, the UE may successfully receive the DL assignment DCI or UL grant DCI and perform BWP switching. However, the UE may fail to perform UL transmission of the scheduled PUCCH/SRS or PUSCH due to LBT failure in the BWP after switching. Since the scheduled UL is not received, the BS cannot know whether the UE has successfully received the indication for BWP switching, and ambiguity may arise regarding the BWP in which the UE is currently positioned.

Therefore, when the UE fails to perform UL transmission due to LBT failure, it may switch to the pre-determined/indicated BWP (e.g., the BWP before switching, initial BWP, or default BWP) and transmit information about the BWP or SR transmission to the BS using the initial/default PUCCH resource. Since the BS is capable of identifying the information about the current state of the UE, LBT failure in the switched BWP, or the current BWP of the UE based on the PUCCH or the information about the BWP transmitted by the UE, it may provide an indication for BWP switching and UL scheduling again.

Figure 12:
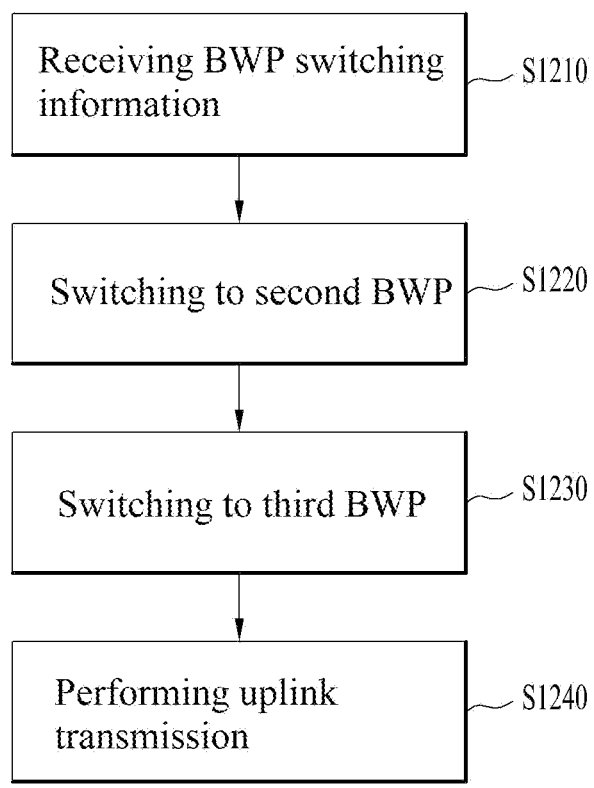
FIGS. 12 and 13 illustrate a signal transmission procedure according to an embodiment of the present disclosure.
Figure 13:
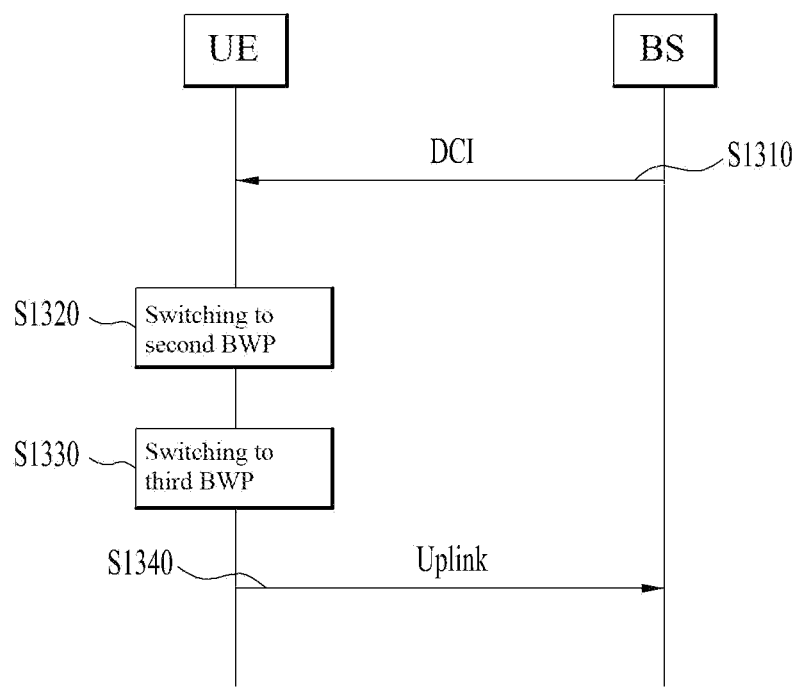

FIGS. 12 and 13 illustrate a signal transmission procedure according to an embodiment of the present disclosure.

Referring to FIG. 12, the UE may receive BWP switching information (S1210), and switch the active BWP from a first BWP to a second BWP based on the BWP switching information (S1220). The BWP switching information may be received by a higher layer signal (e.g., RRC signaling) or a PDCCH (e.g., DL assignment DCI or UL grant DCI). As another example, the BWP switching information may be acquired by expiration of a preset timer. The timer may be a parameter set by a higher layer signal. In addition, the BWP switching information may include an index of the second BWP. The second BWP, which is the switching target BWP, may be indicated by a higher layer signal or PDCCH, or may be a default BWP predetermined between the BS and the UE.

Based on failing to perform first uplink transmission in the second BWP, the UE may perform switching to a third BWP (S1230), and may perform second uplink transmission in the third BWP (S1240). The third BWP may be one of the first BWP, the initial active BWP used for initial access, or a preconfigured BWP different from the first BWP and the second BWP. That is, in S1230, even when the UE is not separately instructed for BWP switching, it may perform BWP switching if uplink transmission fails.

As an example, failing to perform the first uplink transmission may mean that the first uplink transmission fails because the CAP fails in a resource for the first uplink transmission for a preset time or a preset number of times. That is, it may mean that the UE has received scheduling information for the first uplink transmission together with the BWP switching information through DCI or received the scheduling information for the first uplink transmission in the second BWP after switching separately from the BWP switching information, but has failed to transmit a scheduled first uplink due to CAP failure in the second BWP. The preset time or the preset number of times may be a value predetermined between the BS and the UE, a default value (e.g., a value set through a higher layer signal), or a value indicated by the BS.

As another example, failing to perform the first uplink transmission may mean that the UE has failed to receive first uplink scheduling information (e.g., dynamic scheduling through DCI) in the second BWP for a certain time, and thus failed to perform the first uplink transmission. For example, this operation may be a case when DCI including the uplink scheduling information is not transmitted due to CAP failure in the BS.

As an example, when the UE fails to perform the first uplink transmission in the second BWP for the reason as described above, the UE may switch to the third BWP and transmit the second uplink. The second uplink may include an index of the third BWP or information on a result of CAP in the second BWP.

Referring to FIG. 13, the BS may transmit DCI including BWP switching information to the UE (S1310). The DCI is exemplary, and the BWP switching information may be received by a higher layer signal or may be acquired by expiration of a preset timer.

The UE may perform switching from the first BWP to the second BWP (S1320). When the UE fails in the first uplink transmission in the second BWP, the UE may switch to the third BWP (S1330), and transmit the second uplink (S1340). The BS receiving the second uplink may check the current active BWP for the UE and may transmit a BWP switching indication to the UE or perform uplink scheduling, when necessary.

[Proposed method #4] In the case where the UE receives an indication for BWP switching from the BS by methods described below and is scheduled for PUSCH/PUCCH/SRS greater than 20 MHz in the BWP (>20 MHz) to which the UE switches, when the UE succeeds in performing LBT in at least one LBT subband, PUSCH/PUCCH/SRS transmission or BWP-related information may be transmitted in the subband in which the LBT is successful in the BWP (that is, PUSCH/PUCCH/SRS transmission in a partial bandwidth in which the LBT is successful maybe exceptionally allowed).

(1) A case where BWP switching is indicated through the DL assignment DCI and the UE fails to receive additional DL assignment DCI and/or UL grant DCI in the switched BWP for a certain time (where the certain time may be a predetermined value, a default value, or a value set/indicated by the BS) after performing BWP switching;

(2) A case where BWP switching is indicated through DL assignment DCI and the UE fails to perform LBT for a PUCCH resource indicated in the switched BWP for a certain time or a certain number of times after performing BWP switching;

(3) A case where BWP switching is indicated through the UL grant DCI and the UE fails to perform LBT for the UL indicated in the switched BWP for a certain time or a certain number of times after performing BWP switching;

(4) A case where the LBT fails for the UL scheduled through the UL grant DCI for a certain time or a certain number of times after BWP switching;

(5) A case where LBT fails for a scheduled UL for a certain time or a certain number of times after BWP switching due to timer expiration.

LBT failure means that the UE fails in LBT for a certain time or a certain number of times (e.g., 2 ms or 2 times) and cannot perform UL transmission. The certain time or the certain number of times may be a predetermined value, a default value, or a value based on what is set/indicated by the BS.

In addition, the information on the BWP may be an active BWP index. PRACH, SRS, PUCCH, or the like may be used as information informing the BS of BWP switching due to LBT failure or the current BWP of the UE.

In the situation of DC/CA between the L-cell and the U-cell, the UE may periodically/aperiodically transmit active BWP related information for each CC to the BS through the LCC.

Through DL assignment DCI or UL grant DCI, the BS may instruct the UE to perform UL transmission of PUCCH/SRS or PUSCH having a bandwidth greater than 20 MHz in the corresponding BWP (>20 MHz) according to the BWP switching operation. In this case, the PUCCH/SRS/PUSCH may overlap with a plurality of LBT subbands, which are units of 20 MHz. The UE may successfully receive the DL assignment DCI or UL grant DCI and perform BWP switching. However, the UE may fail to perform scheduled UL transmission due to LBT failure in some LBT subbands (in units of 20 MHz) in the BWP after switching. That is, in conventional cases,, when the LBT fails in some LBT subbands in a BWP greater than 20 MHz, the failure is regarded as an LBT failure for the BWP, and thus the UE fails in UL transmission. In this case, since the scheduled UL transmission is not received, the BS cannot know whether the UE has successfully received the indication for BWP switching, and ambiguity may arise regarding the BWP in which the UE is currently positioned.

Therefore, in this proposal, when the UE succeeds in LBT in some LBT subbands and fails in LBT in some other LBT subbands, PUSCH/PUCCH/SRS/DM-RS/PRACH transmission in a partial bandwidth in which LBT is successful may be exceptionally allowed. Thus, PUSCH/PUCCH/SRS having a bandwidth smaller than the scheduled bandwidth may be transmitted or BWP related information may be transmitted.

Since the BS is capable of identifying the information about the current state of the UE, LBT failure in the switched BWP, or the current BWP of the UE based on the PUCCH or BWP information transmitted by the UE, it may provide an indication for BWP switching and UL scheduling again.

[Proposed method #5] When the UE receives an indication for BWP switching from the BS (by L1 signaling, MAC CE, or RRC signaling) by methods described below and fails in the LBT in the switched BWP for a certain time or a certain number of times or fails to receive an additional scheduling indication while a type 1 (RRC only) grant is configured, the UE may transmit PUSCH or BWP related information using the configured grant resource.

(1) A case where the BWP switching operation is performed according the indication of the BWP switching through DL assignment DCI, and then the UE fails to receive additional DL assignment DCI and/or UL grant DCI in the switched BWP for a certain time.

(2) A case where the BWP switching operation is performed according the indication of the BWP switching through DL assignment DCI, and then LBT fails for a PUCCH resource indicated in the switched BWP for a certain time or a certain number of times;

(3) A case where the BWP switching operation is performed according the indication of the BWP switching through DL assignment DCI, and then LBT fails for the UL indicated in the switched BWP for a certain time or a certain number of times;

(4) A case where, after BWP switching, LBT fails for the UL scheduled through the UL grant DCI for a certain time or a certain number of times;

(5) A case where LBT fails for a certain time or a certain number of times for the UL scheduled after BWP switching due to timer expiration.

LBT failure means that LBT fails for a certain time or a certain number of times and thus UL transmission fails. The certain time may be a predetermined value, a default value, or a value based on what is set/indicated by the BS.

In addition, the information on the BWP may be an active BWP index. PRACH, SRS, PUCCH, or the like may be used as information informing the BS of BWP switching due to LBT failure or the current BWP of the UE.

In the situation of DC/CA between the L-cell and the U-cell, the UE may periodically/aperiodically transmit active BWP related information for each CC to the BS through the LCC.

When the UE receiving an indication for BWP switching from the BS fails to receive additional DL assignment DCI and/or UL grant DCI in a switched BWP for a certain time (e.g., 2 ms), synchronization may not be established between the UE and the BS or the BWP in which the UE is current positioned may be recognized differently between the UE and the BS. Therefore, the UE may transmit PUSCH information about the BWP to the BS using the grant resource configured in the BWP.

As in proposed method #2, through DL assignment DCI or UL grant DCI, the BS may instruct the UE to perform UL transmission of PUCCH/SRS or PUSCH in the corresponding BWP according to the BWP switching operation. In this case, the UE may successfully receive the DL assignment DCI or UL grant DCI and perform BWP switching. However, the UE may fail to perform UL transmission of the scheduled PUCCH/SRS or PUSCH due to LBT failure in the BWP after switching. Since the scheduled UL is not received, the BS cannot know whether the UE has successfully received the indication for BWP switching, and ambiguity may arise regarding the BWP in which the UE is currently positioned.

Therefore, when the UE fails to perform UL transmission due to LBT failure, it may transmit PUSCH or information about the BWP to the BS using the configured grant resource. Since the BS is capable of identifying the information about the current state of the UE, LBT failure in the switched BWP, or the current BWP of the UE based on the PUSCH or the information about the BWP transmitted by the UE, it may provide an indication for BWP switching and UL scheduling again.

[Proposed method #6] (Maximum) two BWP inactivity timers for respective CCs or BWPs may be configured for the UE, and the UE may switch to a set default (or initial) BWP when any one of the timers expires.

In conventional cases, one BWP inactivity timer is used. When the timer expires (e.g., DL/UL scheduling is not performed for a certain time), the BWP may be switched to a predetermined BWP. In this proposal, two BWP inactivity timers are used to efficiently perform BWP switching.

(1) A first BWP inactivity timer may perform a timer-related operation only in a period in which it is conformed that the serving cell is being transmitted. In addition, the first BWP inactivity timer may maintain the same timer value in the period in which the serving cell is not confirmed to be transmitted. Confirming that the serving cell is being transmitted may be based on detection of a pre-defined/configured specific signal from the BS by the UE, or may be based on detection of group common (GC)-PDCCH carrying and information on the DL transmission period of the BS. The timer-related operation may mean, for example, resetting the timer when DCI for scheduling PDSCH and/or PUSCH is detected and decrementing (or incrementing) the value of the timer when the DCI for scheduling the PDSCH and/or PUSCH is not detected.

(2) Unlike the first BWP inactivity timer, the second BWP inactivity timer may always perform the timer-related operation irrespective of a period in which a serving cell is confirmed to be transmitted. The timer-related operation may mean, for example, resetting the timer when DCI for scheduling PDSCH and/or PUSCH is detected and decrementing (or incrementing) the value of the timer when the DCI for scheduling the PDSCH and/or PUSCH is not detected.

The first BWP inactivity timer operates the timer value only in the signal transmission period of the BS, thereby preventing the operation of unnecessarily and rapidly switching the BWP due to the DL period in which the BS fails in CAP/LBT. On the other hand, when only the value of the first BWP inactivity timer is set, a mismatch in timer value may occur between the UE and the BS depending on whether reception of a specific signal (e.g., CSI-RS for tracking) indicating whether DL transmission of the serving cell is performed and/or a specific PDCCH (e.g., GC-PDCCH carrying time/frequency domain channel occupancy information about the BS) is successful because whether to operate the timer is determined based on the UE determination based on the specific signal and/or the specific PDCCH. As a method to address this issue, the second BWP inactivity timer may be set such that the UE may perform BWP switching to the default (or initial) BWP when a certain time elapses even if the UE fails to receive the specific signal and/or PDCCH transmitted from the BS. Thereby, the issue of ambiguity about the active BWP between the BS and the UE may be addressed.

The UE may expect that the first BWP inactivity timer is set to a value less than (or equal to) the value of the second BWP inactivity timer.

During the operation of the first BWP inactivity timer, CSI-RS may be considered as a specific signal indicating whether DL transmission of the serving cell is performed. Also, During the operation of the first BWP inactivity timer, a GC-PDCCH carrying time/frequency domain channel occupancy information about the BS may be considered as a channel indicating whether DL transmission of the serving cell is performed. When the specific signal (e.g., CSI-RS) and/or the specific channel (e.g., GC-PDCCH) is detected, the UE may operate the first BWP inactivity timer for a certain time (e.g., T1) from the time when the specific signal and/or specific channel is detected, assuming that the serving cell is being transmitted during the period of T1. In this case, from the perspective of the operation of the first BWP inactivity timer, the UE may not expect the PDCCH outside the period of T1 (regardless of the actual PDCCH scheduling of the BS).

Here, when the GC-PDCCH is detected while there are multiple LBT subbands corresponding to one active BWP, signaling may be delivered to indicate that only some LBT subbands among the LBT subbands belonging to the active BWP are available for DL for a specific time T1 from the GC-PDCCH detection time. For example, the DL available LBT subbands may be indicated among the LBT subbands belonging to the active BWP, using bitmap information in the GC-PDCCH. When only at least one LBT subband among the LBT subbands belonging to the active BWP is available for DL, the UE may recognize that DL transmission of the serving cell is being performed for T1 and thus operate the first BWP inactivity timer. Alternatively, when an LBT subband in which PDCCH monitoring is configured among the LBT subbands is available for DL, the UE may recognize that DL transmission of the serving cell is being performed for the corresponding time within T1, it may operate the first BWP inactivity timer. In other words, if not all LBT subbands belonging to the active BWP are available for DL, the UE may not operate the first BWP inactivity timer during T1. Alternatively, even if some LBT subbands among the LBT subbands belonging to the active BWP are available for DL, the UE may not operate the first BWP inactivity timer during the corresponding time within T1 if the LBT subband in which the PDCCH monitoring is configured is not available for DL.

Once the UE receives a BWP switching indication using the proposed methods of the present disclosure described above, the UE may transmit an acknowledgement message in the current BWP and then perform BWP switching. When the UE may fails to transmit a scheduled PUSCH due to LBT failure after BWP switching, it may switch to the pre-determined/indicated BWP and transmit information on the current BWP thereof to the BS using the initial/default PUCCH resource or the configured grant resource, thereby avoiding ambiguity between the BS and the UE be avoided.

In addition, with the above-described proposed methods of the present disclosure, the BS may clearly recognize whether the UE has properly received the BWP switching indication, or information about the current BWP of the UE, and whether the UE succeeds/fails in LBT. Accordingly, it may indicate switching to another BWP or reschedule the UE may efficiently perform PUSCH transmission and BWP switching by transmitting information about the BWP in which the UE is currently positioned or information on LBT failure (successful LBT in only some LTE subbands), etc., using a specific PUCCH resource, an initial/default PUCCH resource, or a configured grant resource.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 14:
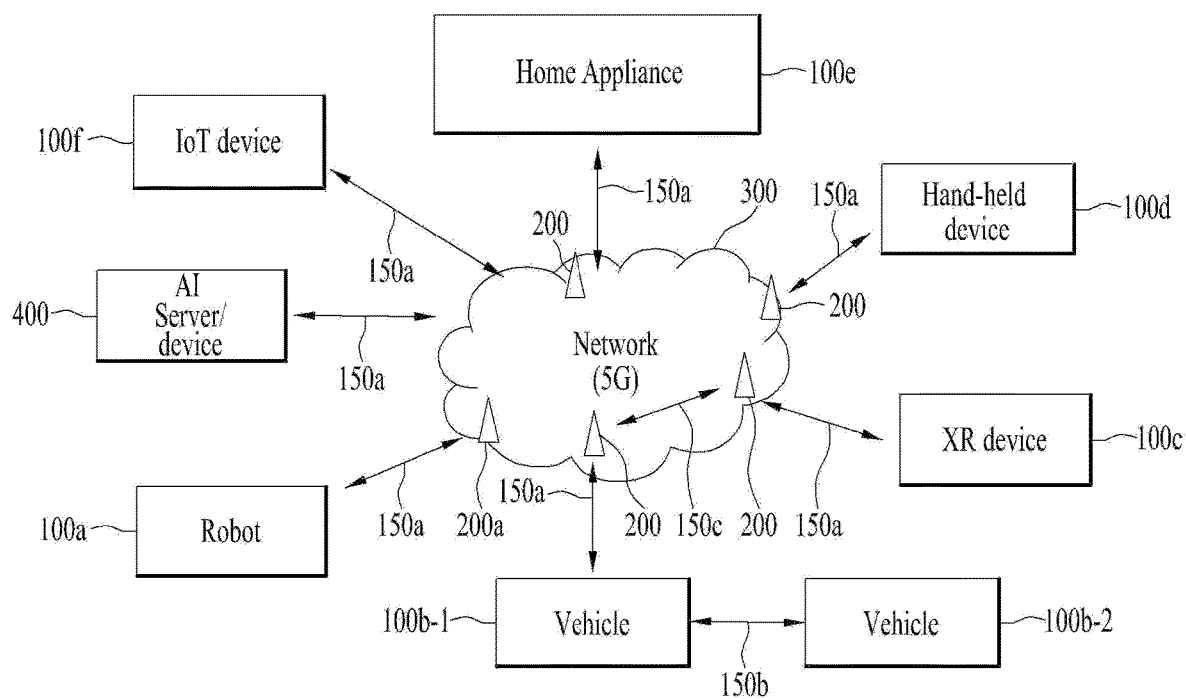
FIG. 14 illustrates an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 15:
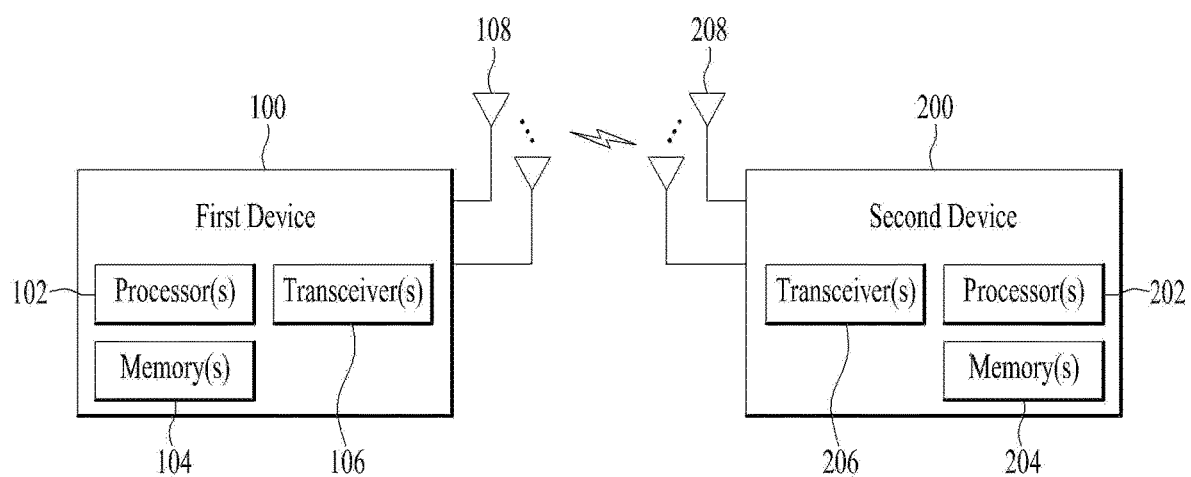
FIG. 15 illustrates an exemplary wireless device applicable to the present disclosure.

FIG. 15 illustrates wireless devices applicable to the present disclosure.

Referring to FIG. 15, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 16:
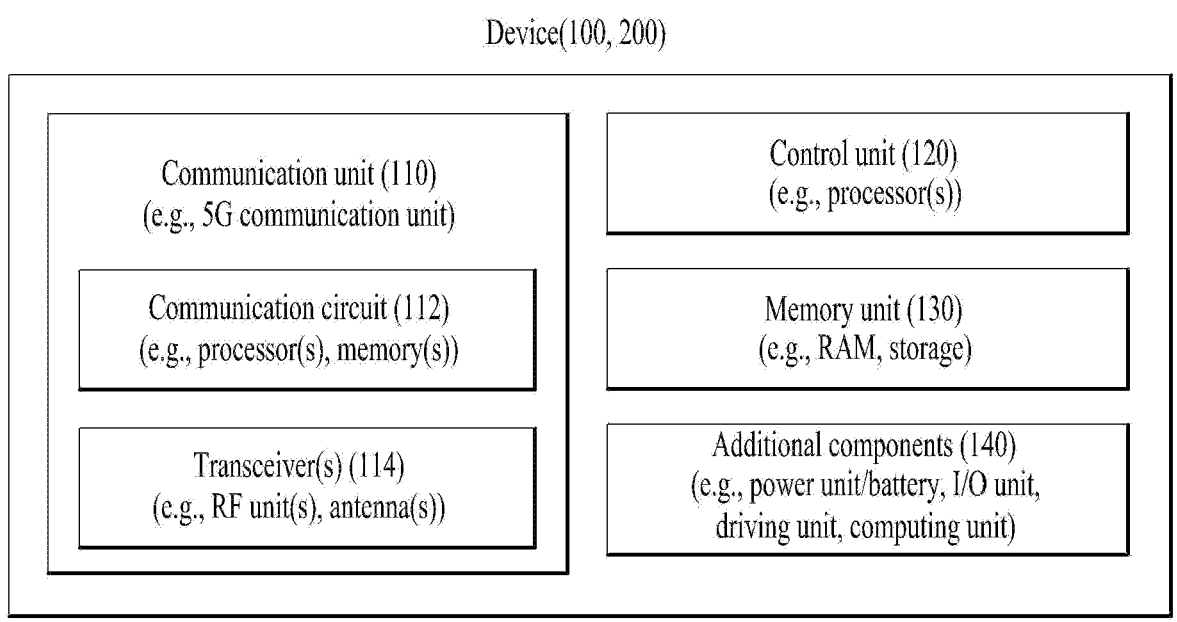
FIG. 16 illustrates another exemplary wireless device applicable to the present disclosure.

FIG. 16 illustrates another example of a wireless device applied to the present disclosure. The wireless device may be implemented in various forms according to a use case/service (refer to FIG. 14).

Referring to FIG. 16, wireless devices 100 and 200 may correspond to the wireless devices 100 and 200 of FIG. 14 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and provides overall control to the wireless device. For example, the control unit 120 may control an electric/mechanical on operation of the wireless device based programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcasting terminal, a hologram device, a public safety device, an MTC device, a medical device, a FinTech device (or a finance device), a security device, a climate/environment device, the AI server/device (400 of FIG. 14), the BSs (200 of FIG. 14), a network node, or the like. The wireless device may be mobile or fixed according to a use case/service.

In FIG. 16, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 17:
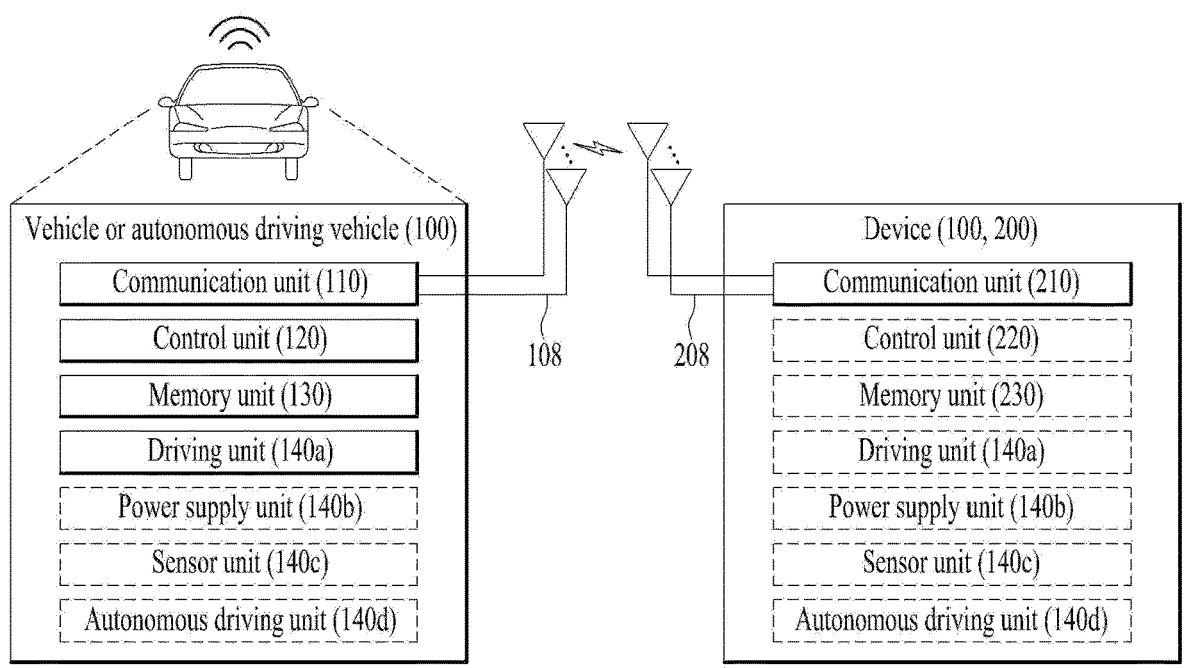
FIG. 17 illustrates an exemplary vehicle or autonomous driving vehicle applicable to the present disclosure.

FIG. 17 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be applied to a terminal, a base station, or other equipment of a wireless mobile communication system.

The invention claimed is:
1. A method comprising:
receiving bandwidth information in a first bandwidth;
switching from the first bandwidth to a second bandwidth based on the bandwidth information;
switching to a third bandwidth different from the second bandwidth based on failure to perform a channel access procedure (CAP) in a resource for first uplink transmission of a data channel in the second bandwidth; and
performing uplink transmission of a control channel in the third bandwidth, wherein the control channel includes information for an index of the third bandwidth and information for a result of the channel access procedure in the second bandwidth, and
the third bandwidth is a preconfigured bandwidth.

2. The method of claim 1, wherein the bandwidth information is received by one of a higher layer signal or downlink control information or is acquired by expiration of a preset timer.

3. The method of claim 1, further comprising:
receiving downlink control information including information on allocation of the resource for the uplink transmission of the data control.

4. The method of claim 1, wherein the failure to perform the uplink transmission of the data control in the second bandwidth comprises failing to receive, in the second bandwidth, downlink control information including information on allocation of a resource for the uplink transmission of the data control for a predetermined time.

5. A user equipment (UE) comprising:
at least one processor; and
at least one memory operably connected to the at least one processor and configured to store instructions that, when executed, cause the at least one processor to perform operations comprising:
receiving bandwidth information in a first bandwidth;
switching from the first bandwidth to a second bandwidth based on the bandwidth information;
switching to a third bandwidth different from the second bandwidth based on failure to perform a channel access procedure in a resource for uplink transmission of a data channel in the second bandwidth; and
performing uplink transmission of a control channel in the third bandwidth, wherein the control channel includes information for an index of the third bandwidth and information for a result of the channel access procedure in the second bandwidth, and
the third bandwidth is a preconfigured BWP.

6. The UE of claim 5, wherein the bandwidth information is received by one of a higher layer signal or downlink control information or is acquired by expiration of a preset timer.

7. The UE of claim 5, wherein the at least one processor is configured to receive downlink control information including information on allocation of the resource for the uplink transmission of the data control.

8. The UE of claim 5, wherein the failure to perform the uplink transmission of the data control in the second bandwidth comprises failing to receive, in the second bandwidth, downlink control information including information on allocation of a resource for the uplink transmission of the data control for a predetermined time.

9. The UE of claim 5, wherein the UE comprises an autonomous vehicle capable of communicating with at least one of a network and an autonomous vehicle other than the UE.

10. An apparatus comprising:
at least one processor; and
at least one memory operably connected to the at least one processor and configured to store instructions that, when executed, cause the at least one processor to perform operations comprising:
receiving bandwidth information in a first bandwidth;
switching from the first bandwidth to a second bandwidth based on the bandwidth information;
switching to a third bandwidth different from the second bandwidth based on failure to perform a channel access procedure in a resource for first uplink transmission of a data channel in the second bandwidth; and
performing uplink transmission of a control channel in the third bandwidth, wherein the control channel includes information for an index of the third bandwidth and information for a result of the channel access procedure in the second bandwidth, and the third bandwidth is a preconfigured bandwidth.

11. A non transitory processor-readable medium storing one or more instructions for causing at least one processor to perform an operation, the operation comprising:

receiving bandwidth information in a first bandwidth;

switching from the first bandwidth to a second bandwidth based on the bandwidth information;

switching to a third bandwidth different from the second bandwidth based on failure to perform a channel access procedure in a resource for uplink transmission of a data channel in the second bandwidth; and performing uplink transmission of a control channel in the third bandwidth, wherein the control channel includes information for an index of the third bandwidth and information for a result of the channel access procedure in the second bandwidth, and the third bandwidth is a preconfigured bandwidth.

* * * * *